Aug. 13, 1935.  C. H. BRINTON  2,011,142
METHOD AND APPARATUS FOR APPLYING CLOSURES
Filed May 20, 1933  15 Sheets-Sheet 1
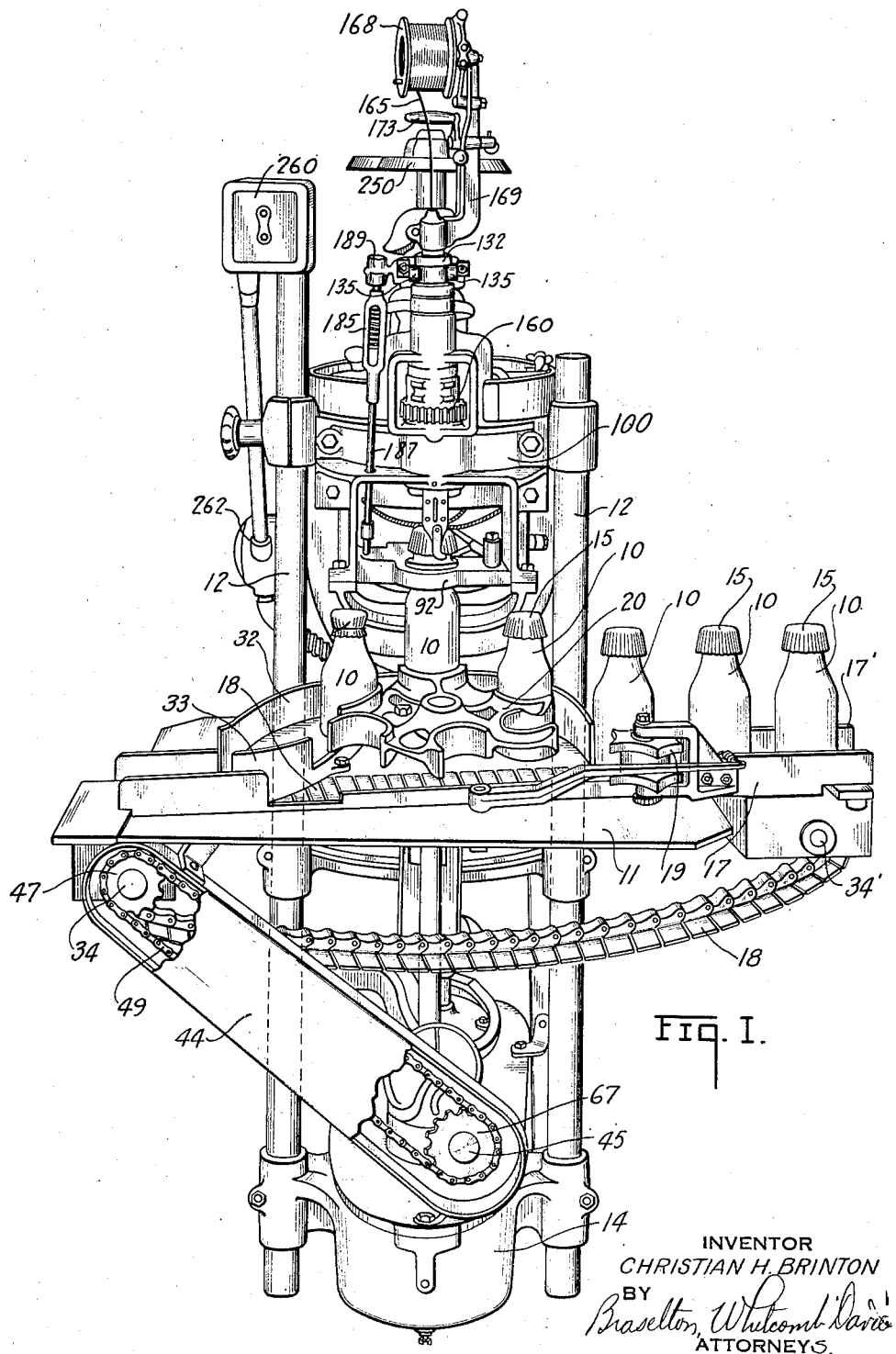
Fig. I.
INVENTOR
CHRISTIAN H. BRINTON
BY
Braselton, Whitcomb Davis
ATTORNEYS.

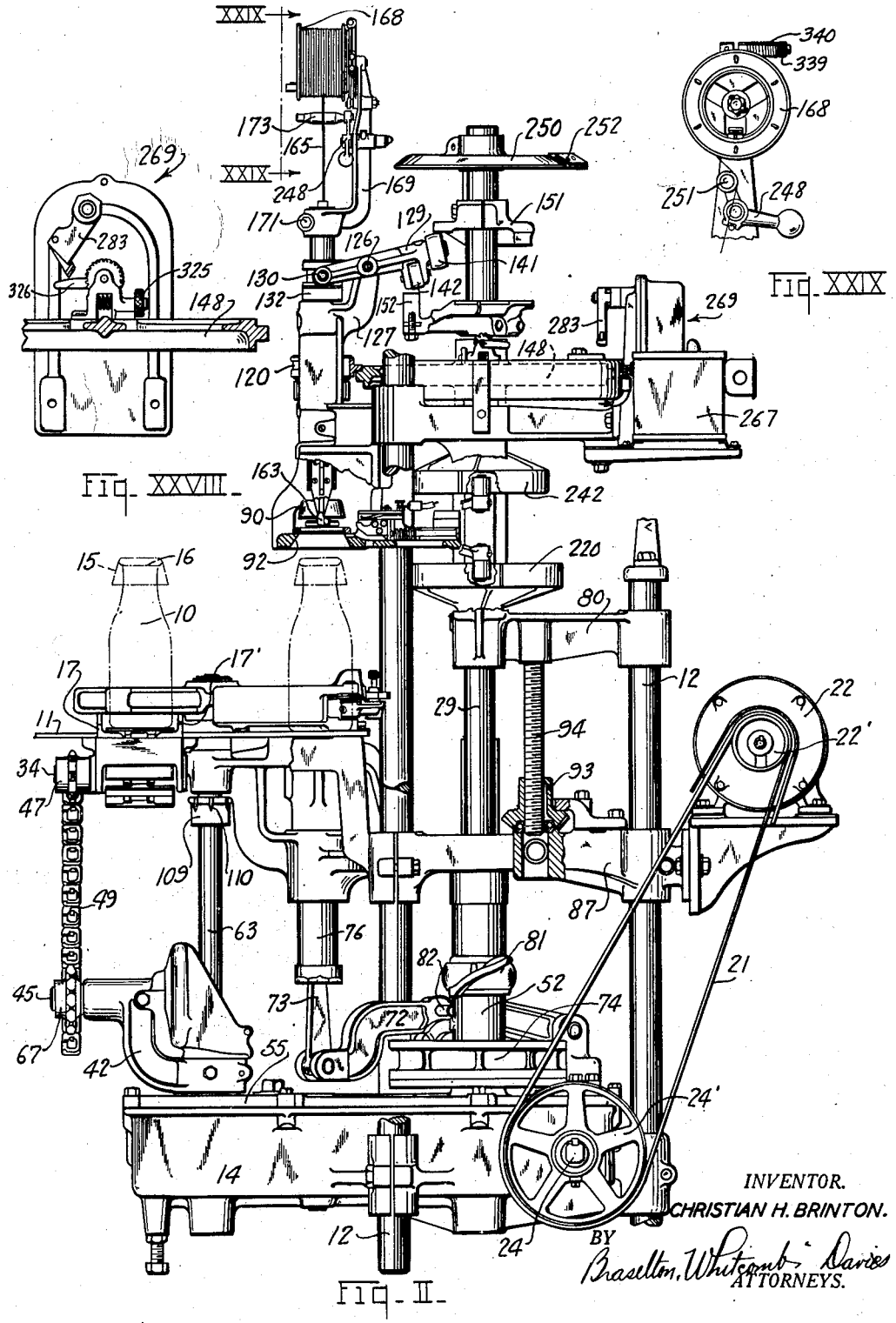

Aug. 13, 1935.  C. H. BRINTON  2,011,142
METHOD AND APPARATUS FOR APPLYING CLOSURES
Filed May 20, 1933  15 Sheets-Sheet 3
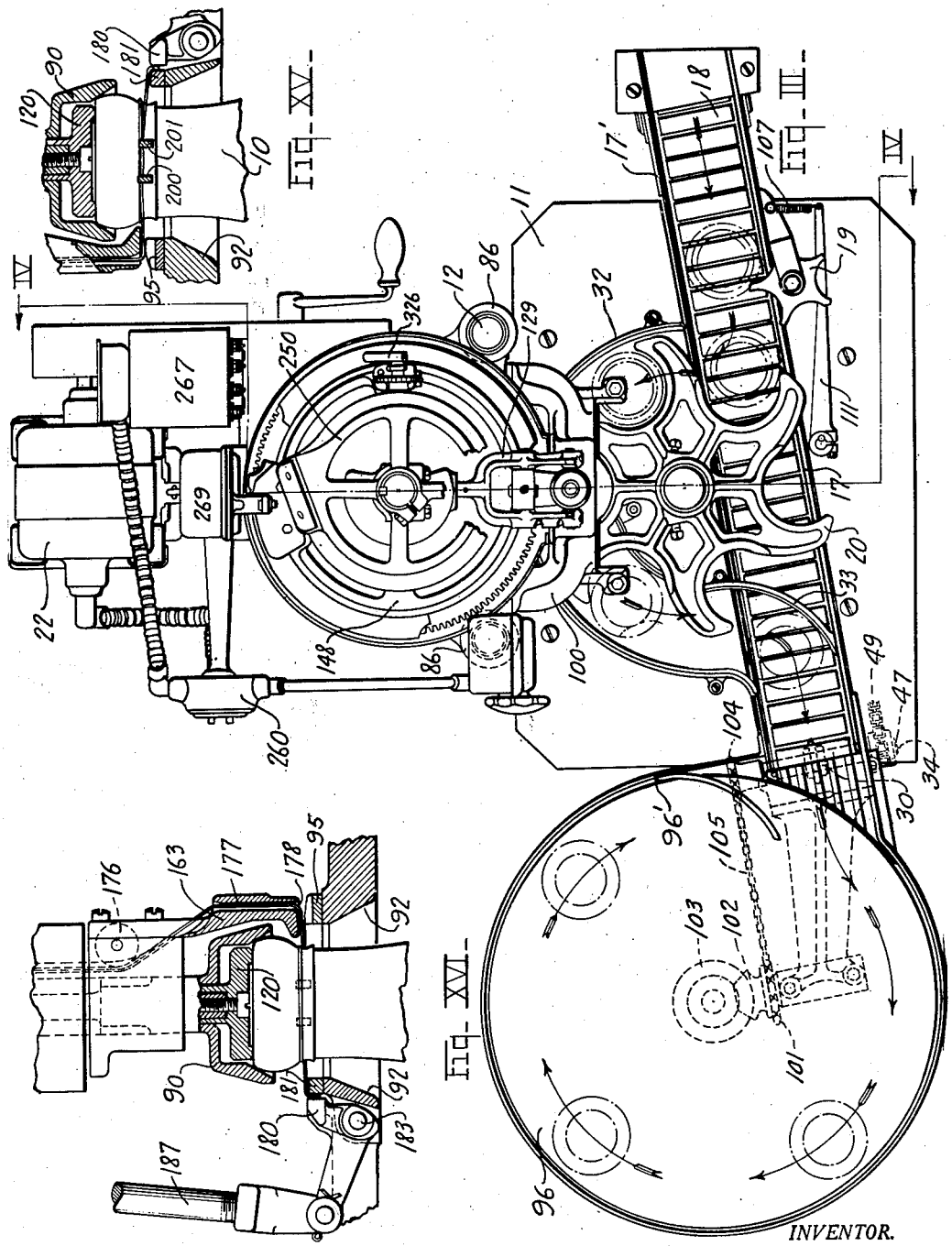
INVENTOR.
CHRISTIAN H. BRINTON.
BY Braselton, Whitcomb Davies
ATTORNEYS.

Aug. 13, 1935.   C. H. BRINTON   2,011,142
METHOD AND APPARATUS FOR APPLYING CLOSURES
Filed May 20, 1933   15 Sheets-Sheet 4
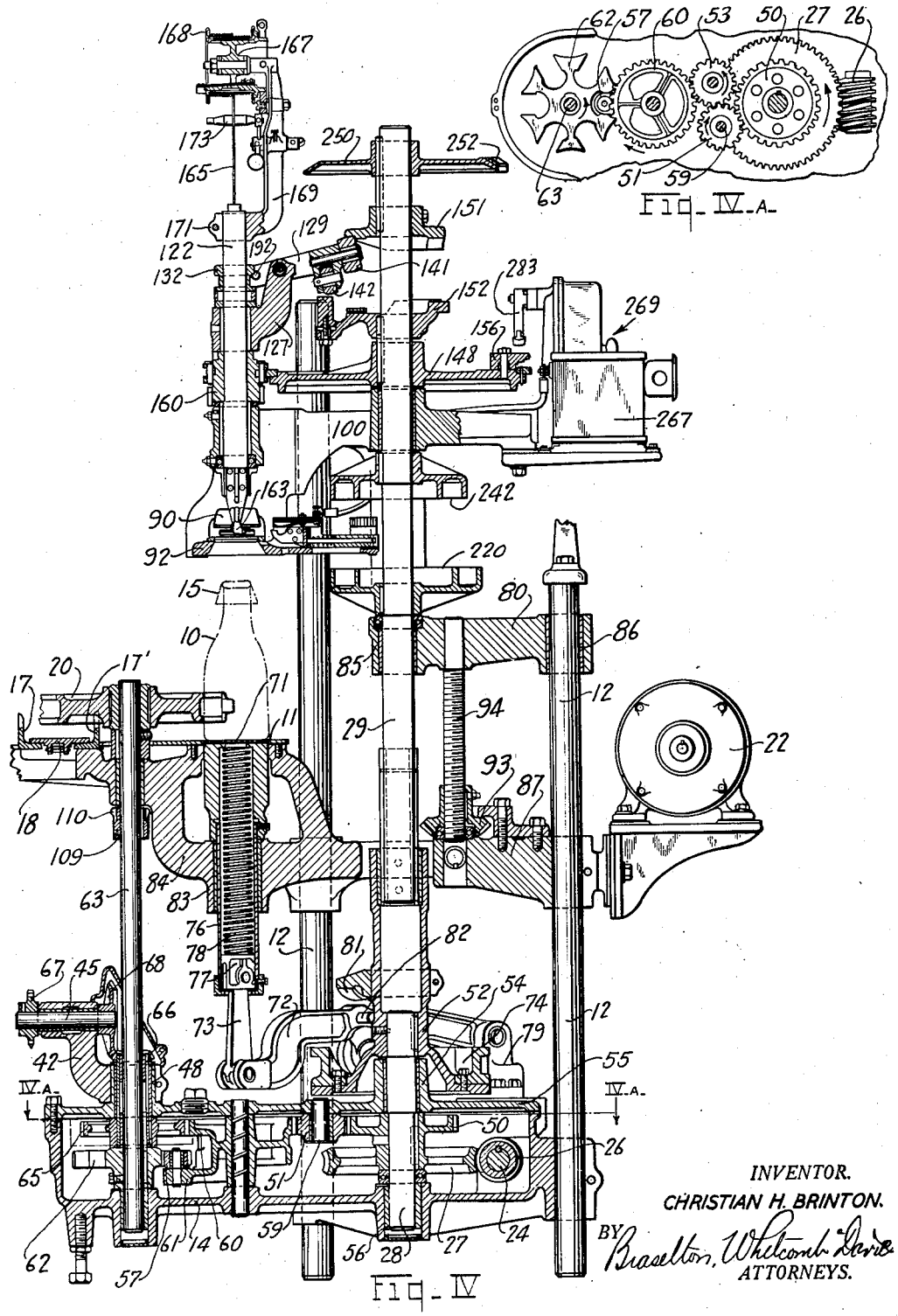
INVENTOR.
CHRISTIAN H. BRINTON.
BY
ATTORNEYS.

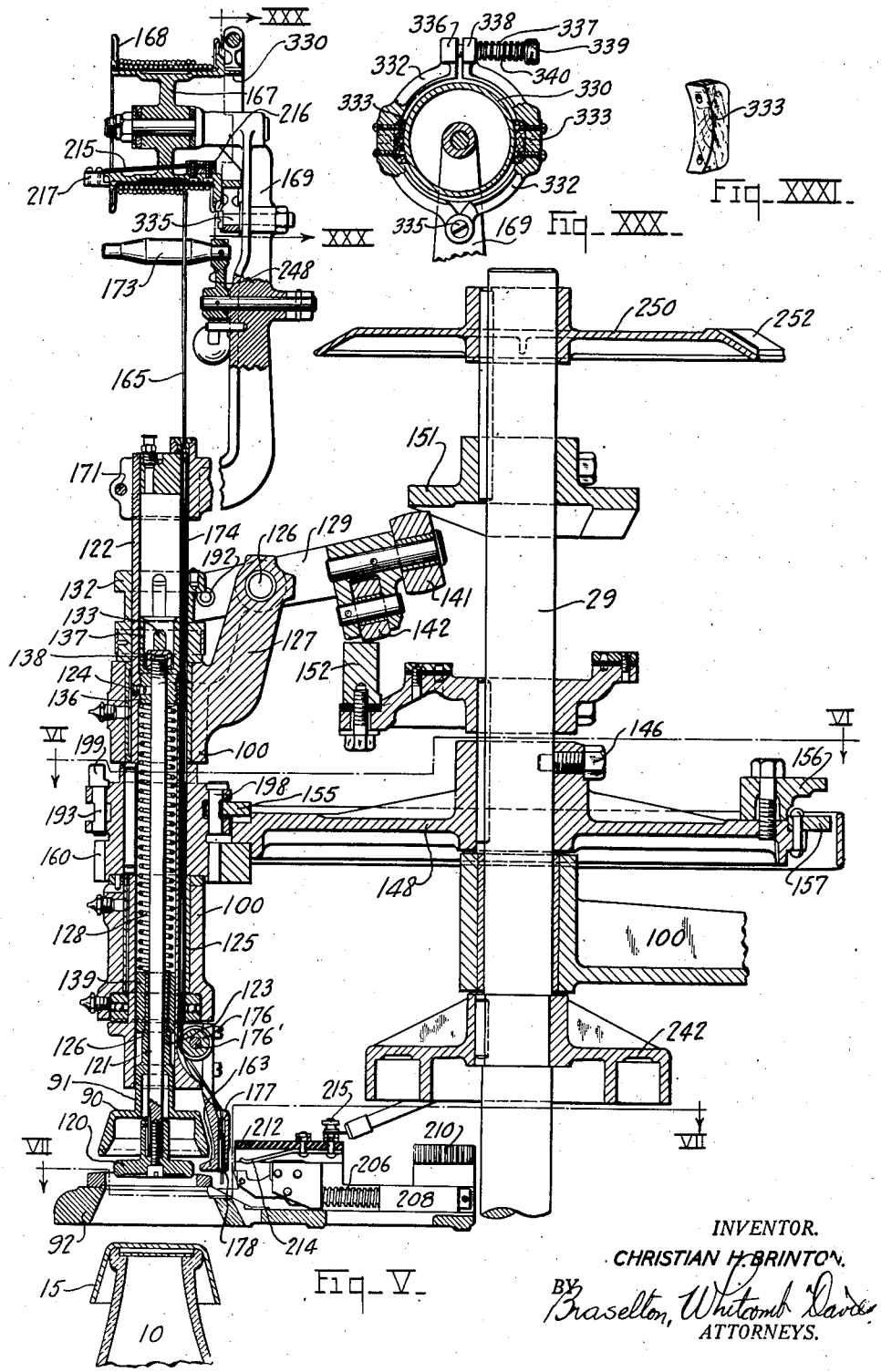

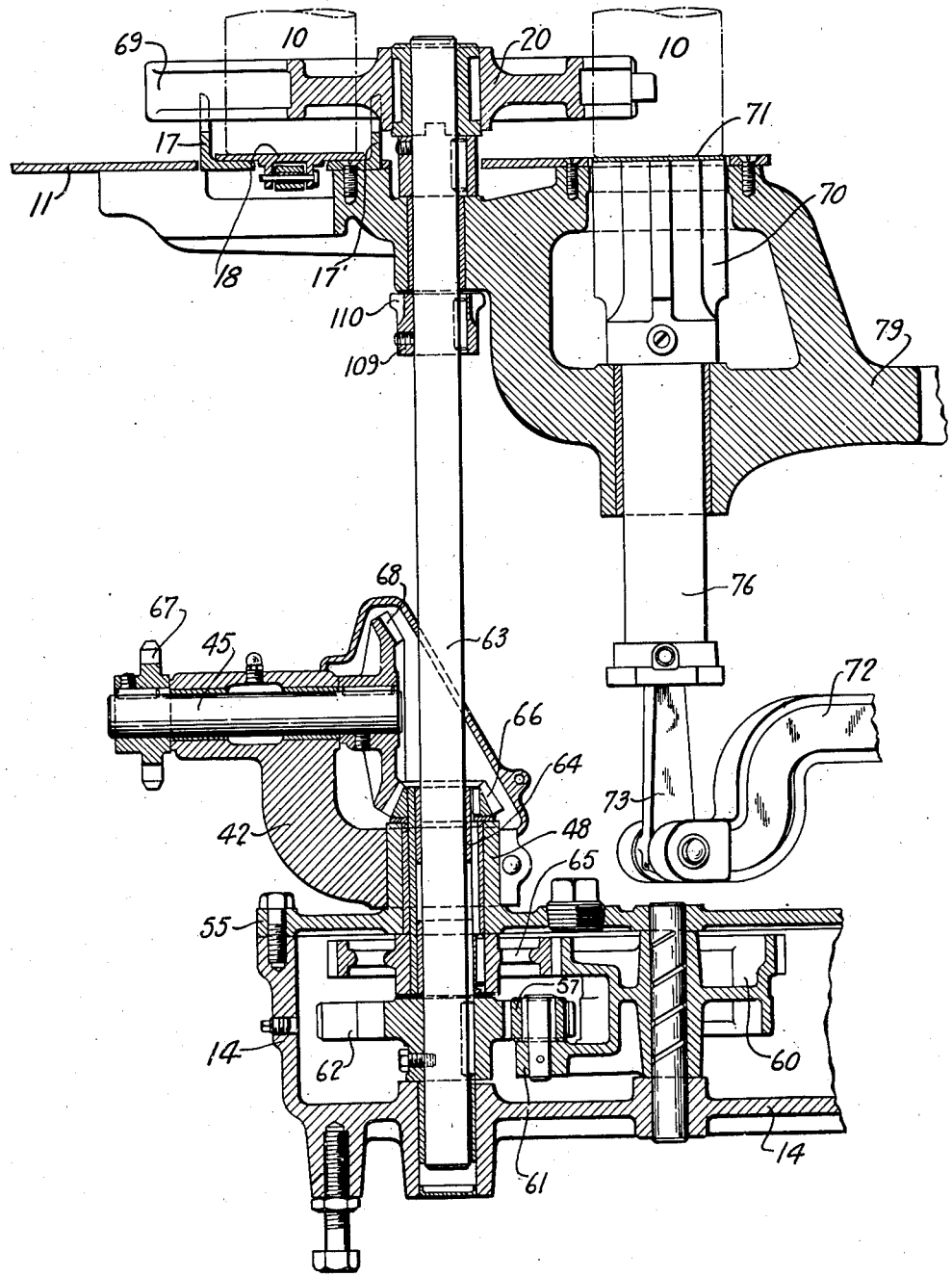
Fig. V-A

Aug. 13, 1935. C. H. BRINTON 2,011,142
METHOD AND APPARATUS FOR APPLYING CLOSURES
Filed May 20, 1933 15 Sheets-Sheet 7
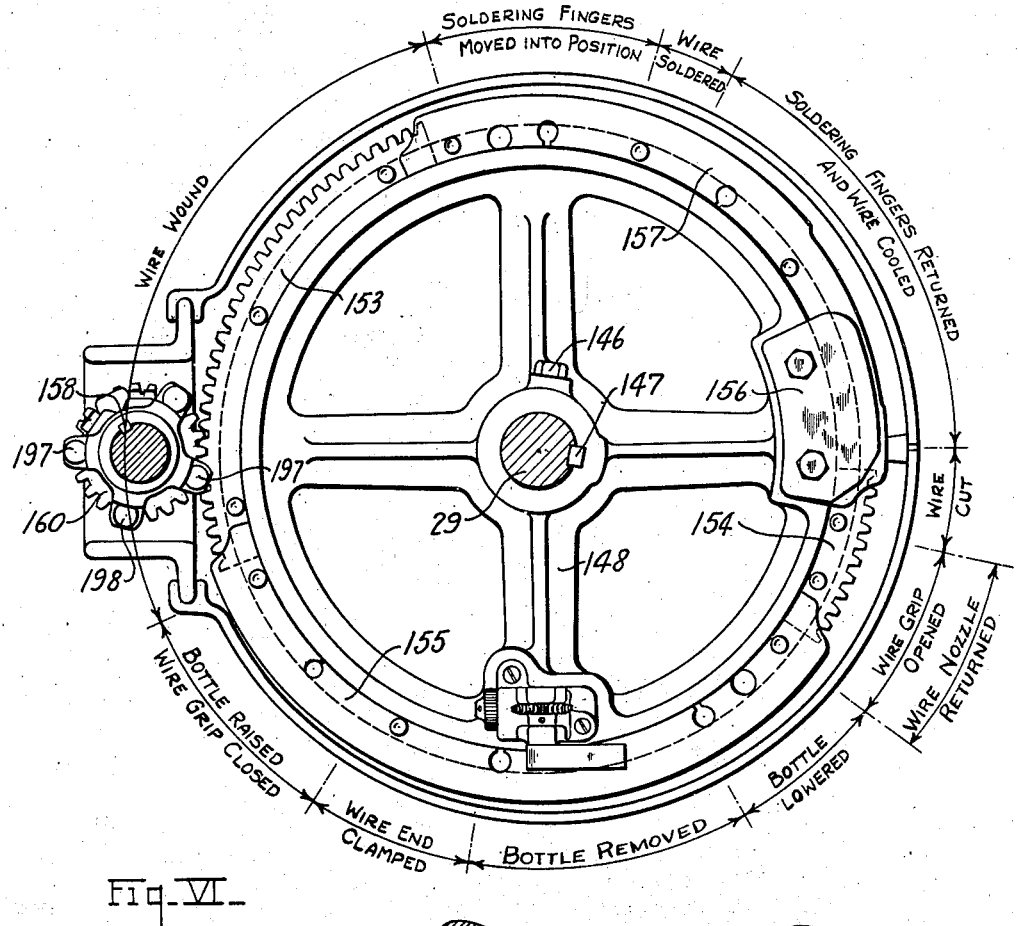
Fig. VI
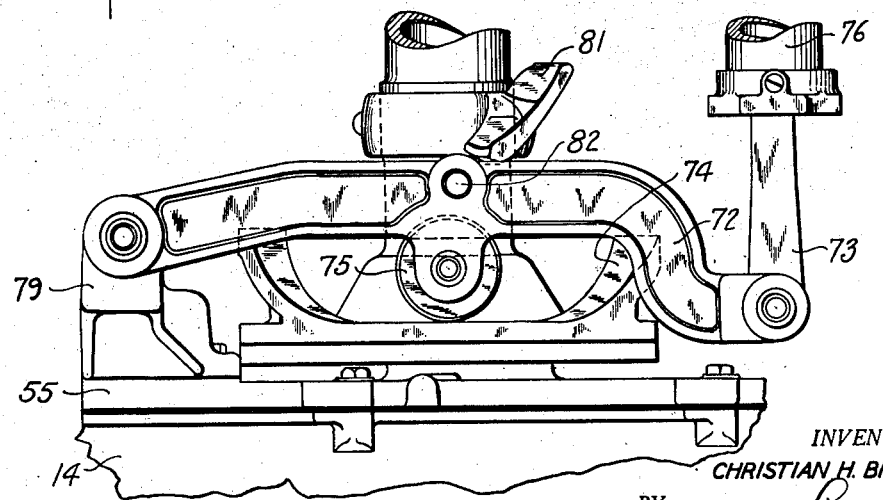
Fig. XIV
INVENTOR.
CHRISTIAN H. BRINTON.
BY Braselton, Whitcomb & Davies
ATTORNEYS.

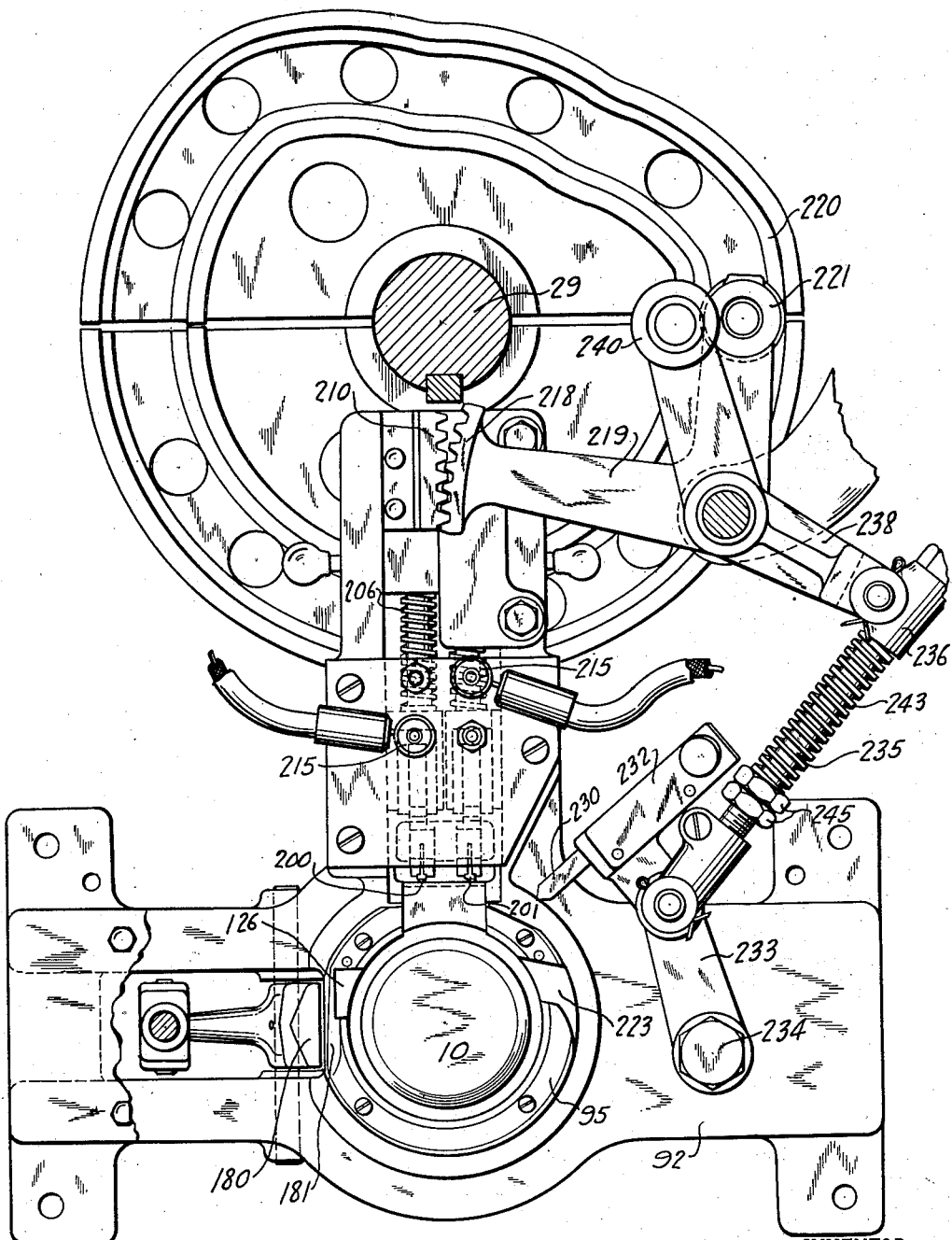

Aug. 13, 1935.  C. H. BRINTON  2,011,142
METHOD AND APPARATUS FOR APPLYING CLOSURES
Filed May 20, 1933  15 Sheets-Sheet 9
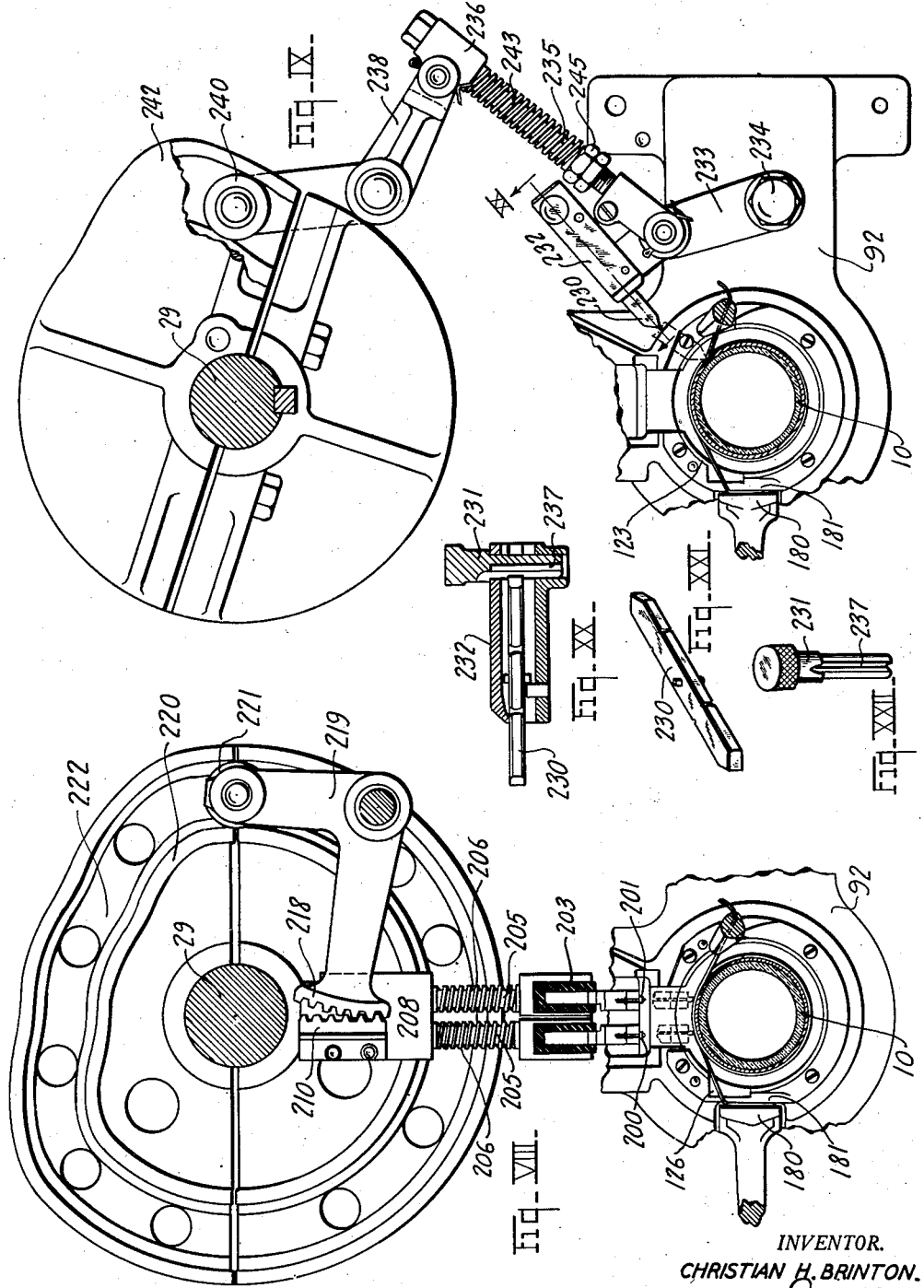
INVENTOR.
CHRISTIAN H. BRINTON.
BY Braselton, Whitcomb Davis
ATTORNEYS.

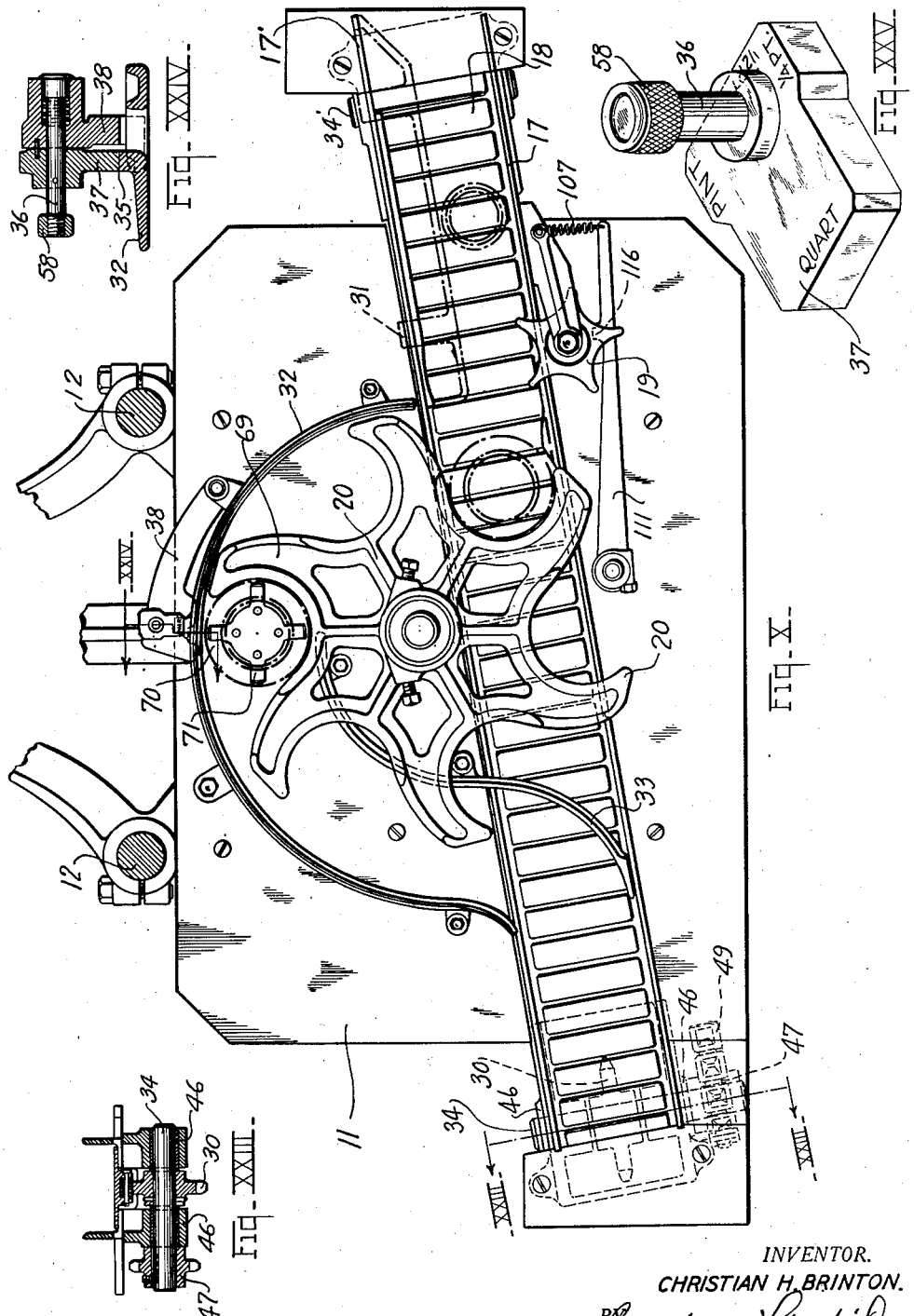

Aug. 13, 1935.  C. H. BRINTON  2,011,142
METHOD AND APPARATUS FOR APPLYING CLOSURES
Filed May 20, 1933  15 Sheets-Sheet 11
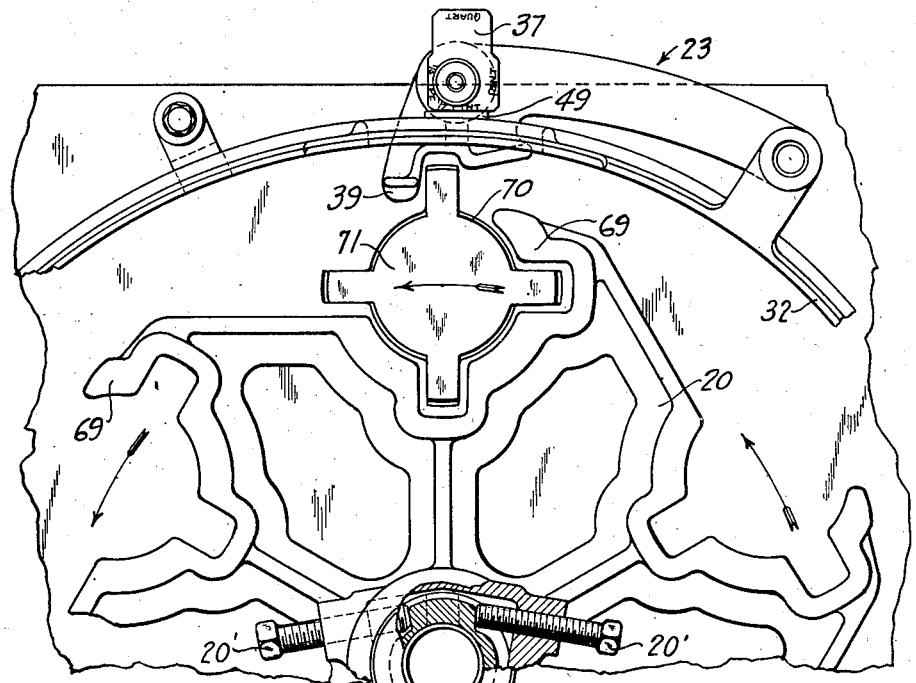
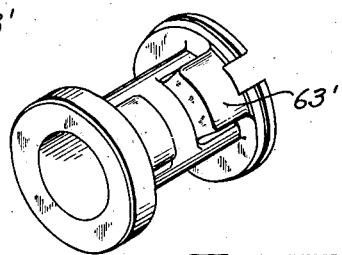
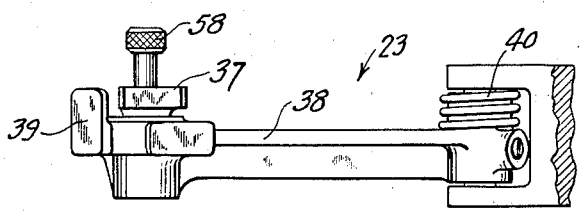
INVENTOR.
CHRISTIAN H. BRINTON.
BY
ATTORNEYS.

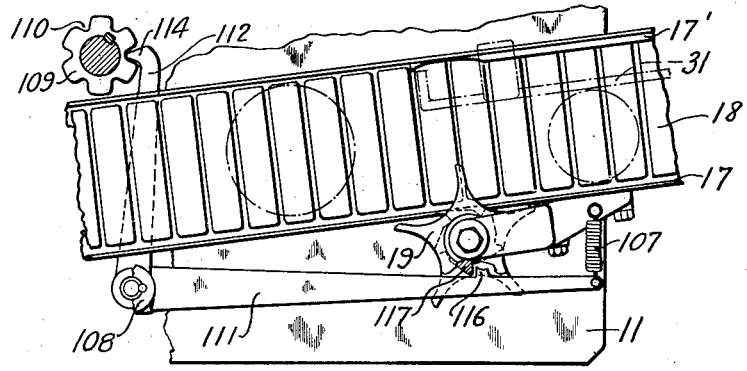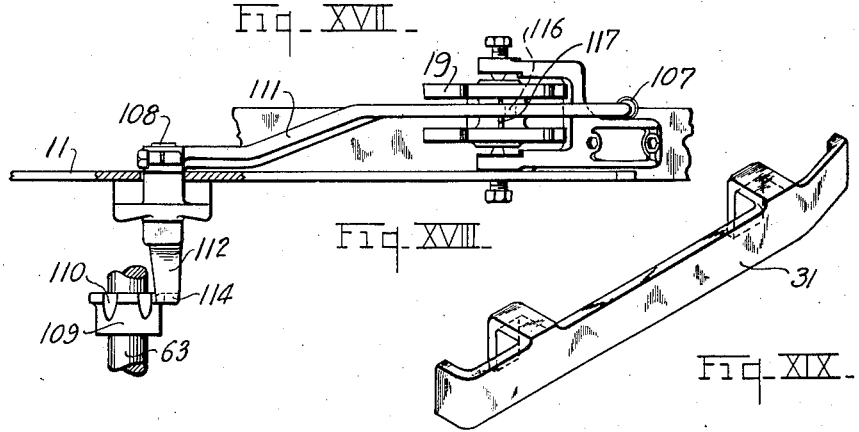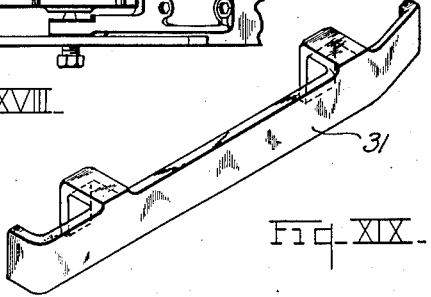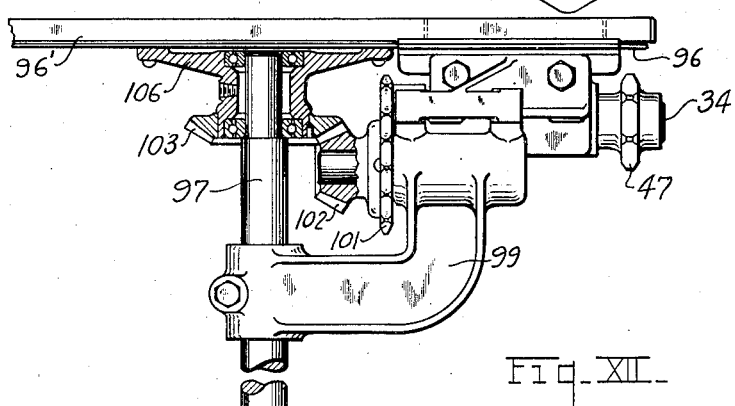

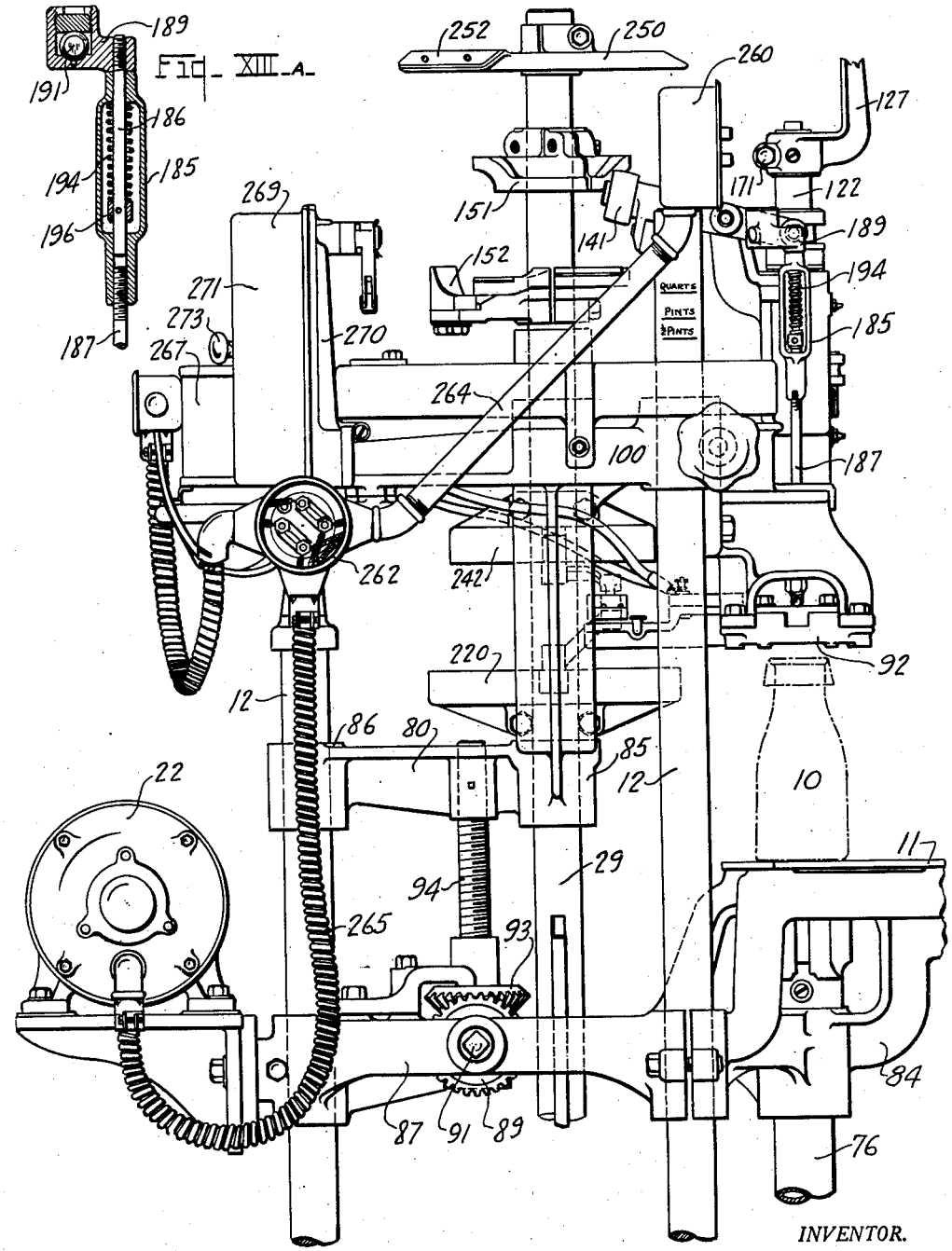

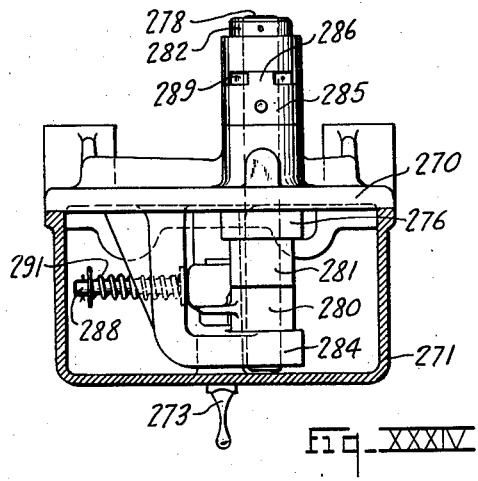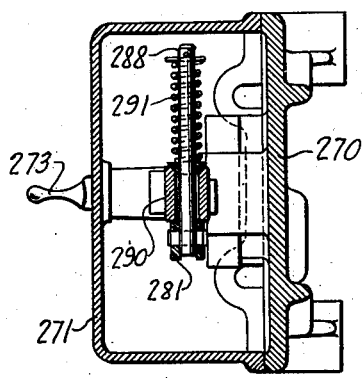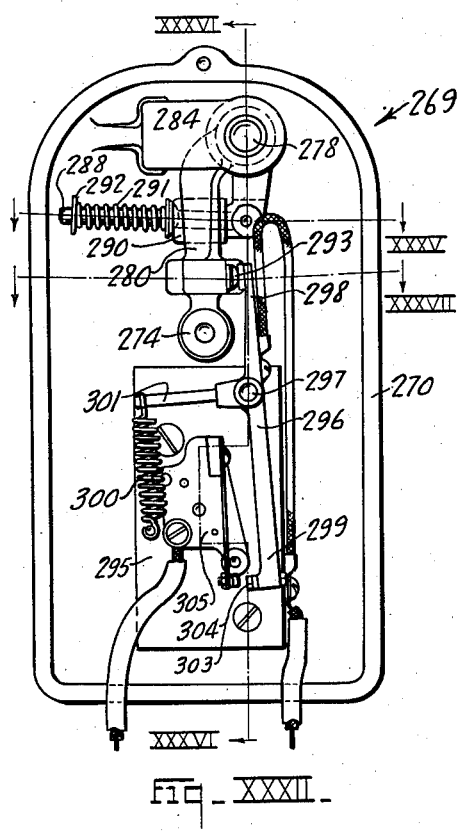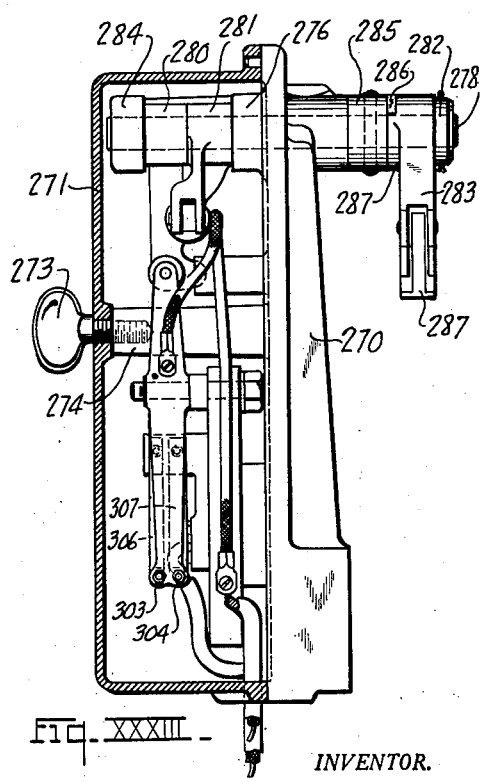

Aug. 13, 1935.  C. H. BRINTON  2,011,142
METHOD AND APPARATUS FOR APPLYING CLOSURES
Filed May 20, 1933  15 Sheets-Sheet 15
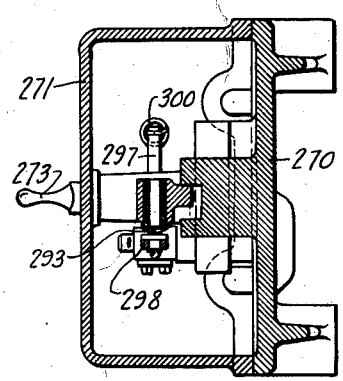
Fig. XXXVII.
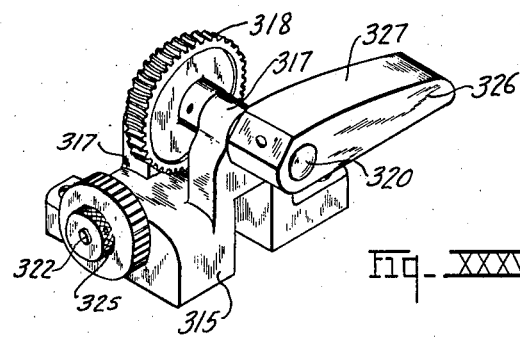
Fig. XXXVIII.
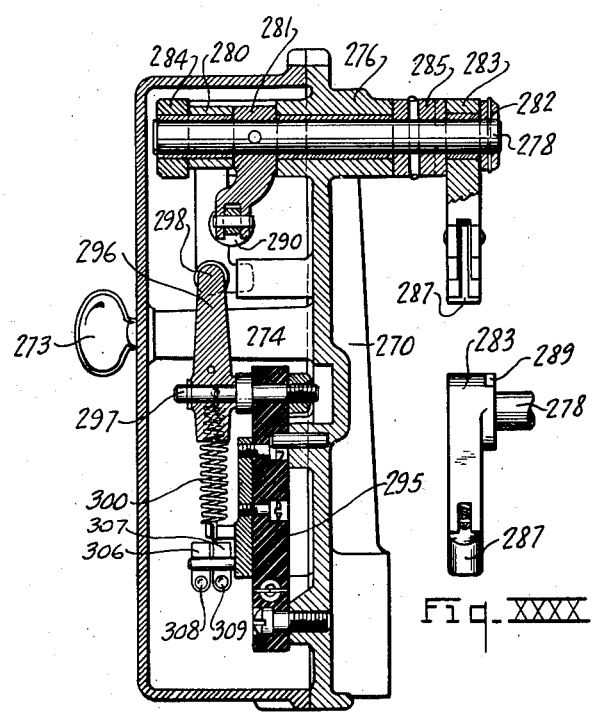
Fig. XXXVI.
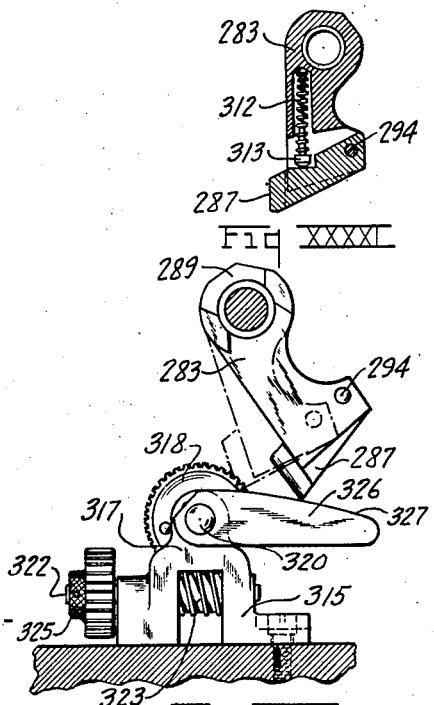
Fig. XXXIX.
INVENTOR.
CHRISTIAN H. BRINTON.
ATTORNEYS.

Patented Aug. 13, 1935

2,011,142

UNITED STATES PATENT OFFICE 2,011,142

METHOD AND APPARATUS FOR APPLYING CLOSURES

Christian H. Brinton, Chicago, Ill., assignor to Standard Cap and Seal Corporation, Chicago, Ill., a corporation of Virginia Application May 20, 1933, Serial No. 672,051

31 Claims. (Cl. 140—94)

This invention relates to a method and apparatus for affixing closure or sealing means to containers, and more particularly to a mechanism for providing an effective destructible seal.

An object of the invention is the provision of mechanism to effectively seal containers in a minimum of time and reduce losses caused by injury to containers or closures.

This invention also includes means adapted for use with the type of sealing apparatus shown herein and also other types wherein bottles of various sizes may be properly fed to a container sealing mechanism or apparatus.

This invention embraces effective means to apply unitary sealing elements to a container from a substantially continuous supply and which automatically provides for successive sealing operations.

The invention includes the provision of control means for the sealing mechanism effective to accurately time the several operations and thus prolong the life of the various mechanisms.

The invention contemplates a novel structure wherein the containers are supplied in accurately timed succession to a sealing mechanism and positively released after the sealing operation has been performed.

A further object of the invention resides in an improved mechanism fully adjustable to compensate for wear of parts and to maintain proper timing between the cooperative elements to insure proper sealing of each container.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure I is a perspective view of a form of machine or apparatus of the invention;

Figure II is a side elevation of the machine shown in Figure I with portions broken away for sake of illustration;

Figure III is a top plan view of the machine of the invention shown in Figure II with the sealing wire supply and certain controlling mechanism therefor removed;

Figure IV is a vertical sectional view taken substantially on a line IV—IV of Figure III;

Figure IV—A is a fragmentary detail view taken substantially on a line IV—A—IV—A of Figure IV;

Figure V is an enlarged fragmentary sectional detail view of the upper portion of the mechanism shown in Figure IV with the winding spindle turned substantially through 90°;

Figure V—A is an enlarged fragmentary sectional view of the lower portion of the mechanism shown in Figure IV;

Figure VI is a sectional detail view taken substantially on a line VI—VI of Figure V also illustrating diagrammatically various timing of operations and functions in terms of gear and cam movement;

Figure VII is an enlarged detail view taken substantially on a line VII—VII of Figure V;

Figure VIII is an enlarged fragmentary detail view showing a form of seal uniting mechanism of the invention;

Figure IX is an enlarged detail view showing a form of strand or seal element severing mechanism of the invention;

Figure X is an enlarged fragmentary plan view of the container feeding mechanism shown in Figure III;

Figure XI is an enlarged fragmentary detail view of a portion of the container feeding and positioning mechanism illustrated in Figure X showing another form of star wheel type container positioning means;

Figure XII is a side elevation of the revolving table container supporting structure shown in Figure III;

Figure XIII is a fragmentary side elevational view of another portion of the machine shown in Figure I;

Figure XIII—A is a detail sectional view of a portion of the wire clamp actuating means;

Figure XIV is an enlarged detail view of container raising and lowering mechanism shown in Figure II;

Figure XV is a fragmentary detail sectional view of portions of the sealing mechanism during sealing operation;

Figure XVI is a view similar to Figure XV with the mechanism turned substantially through 180°;

Figure XVII is a fragmentary view of a portion of the conveyor mechanism showing an arrangement of container feed timing mechanism;

Figure XVIII is a side elevation of the structure shown in Figure XVII;

Figure XIX is an isometric view of container guide structure associated with the conveyor mechanism;

Figure XX is a sectional detail view of the wire severing knife supporting means shown in Figure IX;

Figure XXI is an isometric view of the wire severing knife shown in Figure IX;

Figure XXII is an isometric view of knife positioning and retaining means shown in Figure XX;

Figure XXIII is a sectional detail view of a portion of the conveyor actuating means taken substantially on a line XXIII—XXIII of Figure X;

Figure XXIV is a sectional detail view taken substantially on a line XXIV—XXIV of Figure X showing container gauging means forming a part of the invention;

Figure XXV is a perspective view of the container gauge shown in Figure XXIV;

Figure XXVI is an isometric view of a means for supporting the container feeding and positioning wheel;

Figure XXVII is a detail side elevation of a container positioner and gauge shown in Figure XI;

Figure XXVIII is a front elevation of electrical circuit controlling means and cam mechanism forming a part of the invention;

Figure XXIX is a fragmentary detail view taken substantially on a line XXIX—XXIX of Figure II showing the wire supply and supporting means;

Figure XXX is a vertical sectional view taken substantially on a line XXX—XXX of Figure V showing a form of brake mechanism for controlling the wire supply;

Figure XXXI is a perspective view showing a form of brake element forming a part of the mechanism illustrated in Figure XXX;

Figure XXXII is a front elevational view of an electrical circuit controlling structure forming a part of the invention with the housing removed;

Figure XXXIII is a side elevational view of the structure shown in Figure XXXII;

Figure XXXIV is a top plan view of the mechanism shown in Figure XXXII with the housing shown in section;

Figure XXXV is a sectional detail view taken substantially on a line XXXV—XXXV of Figure XXXII;

Figure XXXVI is a vertical sectional view through the circuit controlling mechanism taken substantially on a line XXXVI—XXXVI of Figure XXXII;

Figure XXXVII is a sectional detail view taken substantially on a line XXXVII—XXXVII of Figure XXXII;

Figure XXXVIII is an isometric view of a portion of a switch actuating mechanism forming part of the invention;

Figure XXXIX is an enlarged elevational detail view of a portion of the switch actuating mechanism shown in Figure XXXVIII;

Figure XXXX is a detail elevation of a portion of the switch mechanism shown in Figure XXXVI;

Figure XXXXI is a vertical sectional view showing a portion of switch actuating mechanism.

It is to be understood that the machine shown for purpose of illustration may be varied widely, still retaining the principles herein indicated. However, in a satisfactorily operating machine for accomplishing the objects hereinbefore set forth, I have provided an arrangement which includes a main drive mechanism, container conveying, positioning and discharge mechanisms, seal positioning, uniting and severing mechanisms, electrical circuit controlling means and other operative means which will hereinafter more fully appear.

The method and apparatus of my invention are herein illustrated as utilized in sealing containers, and more especially bottles, but it is to be understood that I contemplate the utilization of this invention for sealing various types and styles of containers without departing from the spirit and scope of the invention.

The bottles or containers 10 to be sealed after leaving a filling means or machine (not shown) are suitably supplied to a table or stationary deck 11 carried by supports or posts 12 forming portions of a main supporting frame, also support a housing 14 containing power transmission gearing and mechanism, this housing also forming part of the frame structure. The containers 10, as they are supplied to the machine, preferably have closures or caps 15 initially loosely applied thereto, portions of which are to be brought into snug engagement with the container by the apparatus and method of this invention, as for example, portions of the closures underlying the the beads 16 about the container mouths as shown by dotted lines in Figure II. A plurality of substantially parallel container guides 17 and 17' are provided which preferably extend across table 11 and serve to direct or guide the containers during delivery to the container positioning and sealing mechanism, and thence to a receiving station after the sealing operations are completed. As a means for moving the containers 10, a movable conveyor 18 has been positioned adjacent to the guides 17 and 17', the conveyor supporting the containers in a suitable manner. The containers are thus passed between the guides 17 and 17' into position to be selectively engaged by the teeth of an intermittently movable container separating or timing wheel 19 resembling a turnstile which is positioned adjacent guide 17, for example, and serves to time the delivery of the containers as they are moved along by the conveyor to a star-shaped member or container positioner 20 which removes the containers from the conveyor and properly positions them with respect to the sealing mechanism to be hereinafter described, and subsequently delivers the sealed containers to the conveyor to be carried to a receiving station. The container positioner or star wheel 20 is preferably mounted for rotation on shaft 63 through the medium of a hub or mounting 63'. The wheel 20 being adjustable upon the hub 63' by means of screws 20' which are oppositely disposed in the wheel 20, and thus, by manipulation of the screws the wheel 20 is adjusted with respect to the shaft 63.

Main drive mechanism

Any suitable means such as an electric motor 22 may be employed for operating the various mechanisms that are located both above and below the deck or table 11. In the illustrated embodiment of the invention, the motor 22 is employed for operating a drive shaft 24 by means of a suitable drive connection such as belt 21 between a motor pulley 22' and shaft pulley 24'. Power is transmitted from this drive shaft through the medium of suitable gearing to the various operating mechanisms as will hereinafter more fully appear. The shaft 24 has a worm 26 fixedly mounted thereon which is in mesh with a worm wheel 27, the worm wheel being fixed upon a stub shaft 28 on which is also fixed a spur gear 50 forming an integral part of a hub structure carrying worm wheel 27, and a cam supporting bracket 52 externally of said housing 14. The shaft 28 is journalled adjacent its upper end in a bearing 54 carried by the transmission housing cover 55 and at its lower end in a bearing 56 carried by the housing 14. The spur gear 50 is in mesh with a gear 51 fixed upon a stub shaft 59, which in turn engages a gear 53, this second gear being in mesh with a Geneva drive gear 60 which through the medium of a roller 57 engages the Geneva wheel 62 mounted on the lower portion of shaft 63 carrying the container positioner or star wheel 20. The drive gear 60 has an arm 61 integral therewith, which carries the roller 57 which roller is adapted to impart intermittent step-by-step movement to the shaft 63 through the wheel 62. In the embodiment shown, one sixth of a revolution is imparted to shaft 63 for each complete revolution of worm wheel 27 and shaft 28. On shaft 63 is positioned a sleeve 64 which carries a gear 65 at its lower end and a pinion 66 at its upper end. Gear 65, in mesh with the gear 60, is continuously actuated thereby independently of shaft 63.

Extending vertically from the bracket 52 and secured thereto for rotation therewith is a shaft 29 upon which is positioned a plurality of instrumentalities for controlling and actuating the sealing mechanism, as will hereinafter more fully appear.

*Container conveying, positioning and discharge mechanism*

The conveyor 18 may be of the link belt type as illustrated, the links or segments of which are joined together to form an endless conveyor and is actuated by means of a sprocket 30 mounted upon a stub shaft 34, journalled in bearings 46 carried adjacent an end portion of table 11. The conveyor 18 is also supported adjacent the other end of table 11 by means of an idler sprocket (not shown) carried on shaft 34'. One extremity of shaft 34 is provided with a sprocket wheel 47 which imparts motion to the conveyor 18 from means such as chain 49 driven by a sprocket wheel 67 carried on a shaft 45, a suitable guard 44 enclosing the sprockets and chain. The shaft 45 is preferably journalled in a bracket 42 adjacent the housing cover 55 as shown in detail in Figure V—A, the bracket being mounted upon the exterior of bearing 48 through which shaft 63 and sleeve 64 extend. Shaft 45 is driven by the pinion 66 on sleeve 64 which engages a second pinion 68 carried by shaft 45. Thus, rotation of pinion 66 through the previously described gearing in housing 14 imparts motion to the conveyor 18. By utilizing sprockets 47 and 67 having the proper number of teeth thereon, the speed of conveyor 18 may be timed in proper relation to supply containers to the star wheel 20. It will be noted that several containers may be placed upon the conveyor at the receiving end thereof and that the container separating or timing wheel 19 permits a single bottle at a time to pass and be engaged by the star wheel 20.

A curved guide or guard 32 has been provided which extends from a point adjacent the separating wheel 19, around a star wheel 20 and to the conveyor as particularly illustrated in Figure X, which guide is preferably secured to table 11 in any suitable manner. A second guide 33 of substantially S-shape extends from container sealing position to the forward side of the conveyor 18, which guide 33 cooperates with guide 32 to form a channel through which the sealed containers pass and are replaced upon the conveyor 18.

Provision has been made for the accommodation of bottles or containers of various sizes without necessitating material alteration of the mechanism. The conveyor 18 is preferably of a width to accommodate a quart bottle for example or the largest size container with which the machine is to be used, and the separating wheel 19 permits the passage of a bottle or container of that size. When it is desirable to accommodate the machine to smaller bottles, the container guiding means leading to table 11 is modified in order that the bottles may be moved into engagement with the wheel 19. This is accomplished by the use of a supplemental guide member 31 which is insertable adjacent the guide 17', as shown in dotted lines in Figure X. The guide 31 is removably secured to the chute and includes a side wall portion arranged parallel to a wall or guide 17' and serves to decrease the effective width of the conveyor and directs the smaller bottles against the opposing wall 17 thereof adjacent to which is positioned the separating wheel 19.

In order to accommodate smaller bottles, as for example, pints, ½ pints or ¼ pints, it has been found desirable to employ a plurality of interchangeable star wheels 20 of appropriate size, preferably one for each size bottle, so that a star wheel having teeth or arms 69 of desired size and configuration may embrace the exterior of the bottle and move the same into sealing position on the pedestal pad 71. Adjacent the pedestal pad 71 is an adjustable stop or bottle positioning gauge 23, which preferably includes a spring pressed arm 38 having projection 39 engageable with each bottle to properly position the same upon the pedestal. The arm carries an adjustable block 37 thereon of irregular contour, the particular position of this block determining the position of the stop member 39 to accommodate various sizes of bottles. The block 37 is pivoted on arm 38 as at 36, and having its gauge walls of unequal distances from its pivot point. The block 37 is adapted to be adjusted so that the proper wall engages a fixed surface 35 formed on the guard 32 carried by table 11. A knurled knob 58 is carried by the pivot member 36 and serves as manipulating means to change the position of the block 37 relative to surface 35. As block 37 is carried by arm 38, the position of projection 39 is adjusted relative to the vertical axis of the pedestal 70. The projection 39 serves as a means to position the bottle properly with respect to the sealing mechanism. An improper adjustment or setting of block serves to give an audible indication to the operator in the following manner. For example, should the block 37 be set for ½ pint bottles, and quart bottles are being supplied thereto, the arm 38 would be appreciably moved away from the stop surface 35 and then snap back, causing an audible signal, indicating improper setting of the block. With a proper adjustment there would be little or no relative movement as the projection permits the proper sized bottle to be removed from the sealing position by the star wheel 20, without material movement of arm 38 against the tension of the spring 40.

The table 11 is provided with an opening to accommodate a bottle supporting pedestal 70, which is adapted to be gradually elevated and restored to the plane of the table during the sealing operation to be hereinafter described, which takes place when the pedestal 70 is in the upper range of its movement.

As particularly illustrated in Figures IV and V—A, mounted upon cam supporting bracket 52 is an elevating cam 74 upon which bottle lift cam roller 75 carried by arm 72 travels to elevate and lower the bottle to be sealed. The bottle pedestal 70 is assembled with a link 73 pivoted to the cam roller supporting lever or arm 72 so as to rise and fall therewith. As illustrated, a pedestal pad or bottle support 71 is carried at the upper end of a sleeve 76 within which is reciprocably positioned a plunger or piston 77 at the lower end thereof and is normally held in its lowermost position relative to sleeve 76 by means of a coil spring 78 which abuts at its lower end upon the piston and at its upper end against a shoulder formed on pedestal 70 fixed to the upper end of sleeve 76. The other end of lever 72 is pivoted upon bracket 79 supported upon the gear housing cover 55 in a suitable manner. A retracting cam 81 is also provided upon the bracket 52, which cam at a proper time engages a pin 82 carried by a lever 72 and positively insures return downward movement of pedestal 70 upon completion of the sealing operations.

As the shaft 28 rotates through one complete revolution the bracket 52 and cam 74 rotate therewith, raising and lowering the cam roller 75 and its associated mechanism to elevate and lower the pedestal 70 to enable the pedestal and pad portion 71 to function to elevate a bottle or container to and from the seal applying means. As the shaft 28 and the parts thereon rotate, the sleeve 76 rises and falls due to the normally fixed relation of the piston 77 therewith under the stress of spring 78. The sleeve is guided in its movement by bearing 83 carried in a support 84. If, in the final sealing operation, the bottles should encounter undue strain by reason of bottle size variations or other abnormal causes, the spring 78 will yield to prevent the bottles from breaking, or damaging the mechanism as the piston 77 merely then compresses the spring 78.

Means have been provided to adjust the sealing mechanism to accommodate bottles of various heights which will now be described. To this end, I have provided a movable support 80 which is slidable along the shaft 29 through the bearing 85, and with certain of the posts 12 as through bearings 86 whereby the support 80 may have movement lengthwise of the shaft 29 and posts 12. The casting 87 is fixedly mounted upon the posts 12 and supported on the casting is a stub shaft 91 carrying a bevel gear 89 which meshes with a second bevel gear 93 internally screw threaded and engaging a threaded elevating screw 94. The screw 94 has an unthreaded portion journalled in the support 80 so that this support may be elevated and lowered along the shaft 29. The outer end of the shaft 91 is squared as shown in Figure XIII, so that the bevel pinion 89 may be turned by means of a removable hand crank (not shown) to rotate the bevel gear 93 and screw 94 to elevate or lower the support 80. By this means, the mouthpiece 92 of the sealing means which is also carried by the support 80 through the intermediation of mechanism to be described, and which is provided to receive the tops of the bottles, may be elevated or lowered to suit the heights of the bottles being operated upon.

The mouthpiece or guide 92 also constitutes a bottle positioner and serves to direct the upper ends of the bottles into a member chuck 90, and also serves to gather the skirt of each bottle closure about the bottle neck preparatory to the application of the sealing ring or band about such closure.

The star wheel 20 moves each bottle successively into position on the pedestal pad 71 to be there elevated to sealing position. As the star wheel turns a portion of a revolution, the timing wheel 19 is permitted to turn sufficiently to allow a bottle to pass along the conveyor past the bottle separating wheel 19. To accomplish this, a collar 109 is keyed or otherwise secured upon star wheel shaft 63, which collar is provided with a series of grooves or indentations 110. A lever 112 is pivoted by means of a shaft 108 on table 11 adjacent the conveyor 18, and has a projection 114 adapted to engage in grooves 110 in collar 109. The shaft 108 also carries an arm 111 having a pawl or projection 116 adapted for engagement with ratchet teeth 117 forming part of wheel 19. A spring 107 normally urges the projection 116 of arm 111 in engagement with the ratchet teeth 117. Upon rotation of shaft 63 carrying collar 109 with it, portion 114 rides out of a groove 110, which moves arm 111 away from wheel 19, permitting the latter to be rotated by the bottle in contact therewith under the influence of the forward movement of conveyor 18. Thus, as the portion 114 rides out of a groove 110, one bottle is permitted to pass the wheel 19 to be immediately engaged by an arm of the bottle positioning star wheel 20, and carried to the pedestal 70. The bottle, in being raised by pedestal 70, has its mouth end brought snugly into the chuck 90 which is in axial alignment with the pedestal that carries the bottle. The bottle, upon being elevated, engages and raises a plunger 120 which extends downwardly into the chuck 90, as particularly illustrated in Figure V. The plunger has a stem 121 which is mounted to slide longitudinally in the bore of a winding spindle or sleeve 122, the latter being rotatably mounted in vertically aligned bearings 124 and 125. The bearings 124 and 125 are carried by a casing 100, which casing is in turn supported by posts 12. The upper portion of casing 100 is formed with an integral bracket 127 which pivotally supports a yoke lever 129 having portions 130 cooperating with a grooved collar 132 secured to the winding spindle 122 by means of a pin 133 extending through the walls of spindle 122. When the plunger 120 is raised by the bottle beneath it, the upper end of the plunger stem 121 lifts the collar 132 through the medium of a pilot screw 136 threadedly engaging the wall of spindle sleeve 122, retainer 137 and nut 138 carried by stem 121. As pin 133 is secured to the retainer 137 as well as collar 132, movement of stem 121 is transmitted to the collar 132 and yoke lever 129, thus actuating the lever, upon which is journalled a plurality of cam rollers 141 and 142. Roller 141 is adapted for engagement with cam 151 adjustably mounted upon shaft 29, while roller 142 engages a bottle push down cam 152 also carried by the shaft 29 for rotary movement therewith. The groove of the collar 132 accommodates rollers 135 carried by the yoke lever 129 which is intermediately pivoted upon the stub shaft 126 journalled in the end of the bracket 127. The contour of cam 151 is such as to periodically raise collar 132 and parts associated therewith in timed relation with the upward movement of the bottle resting on the pedestal 70, and cam 152 functioning as a means to release the sealed bottle from the chuck 90, by cooperation with spring 128 positioned between pilot screw 136 and sleeve 139 mounted interiorly of and adjacent the lower portion of spindle 122. The spring 128 exerts downward pressure upon the sleeve 139 to urge the latter as well as the plunger 120 normally to their lowermost positions. The chuck 90 has a guiding portion 123 integral therewith which extends within the spindle 122 and is formed with a shoulder portion 126 which periodically engages with the sleeve 139. Thus, when the plunger stem 121 is raised by the bottle and the inner walls of the chuck 90 engage the closure loosely resting on the bottle mouth to properly center the bottle prior to the seal applying operation, any irregularities in the size of the bottle are compensated for by resiliency of spring 128.

Also carried by shaft 29 is a comparatively large wheel 148 which carries a plurality of gear segments 153 and 154, and cam members for controlling and actuating the bottle sealing mechanisms. As illustrated in Figure VI the wheel 148 is keyed as at 147 to shaft 29 and further secured by means of a set screw 146. Mounted upon the wheel 148 is a gear segment 153, a comparatively short gear segment 154, bottle raising and lowering mechanism actuating cam 155, wire sealing cam 157 and wire slackening cam 156. During each revolution of wheel 148, gear segment 153 engages winding spindle rotating gear 160 mounted in fixed relation upon spindle 122, being keyed or otherwise secured thereto as at 158 and during this engagement of this segment and gear the spindle is rotated through substantially one and one half revolutions, carrying the wire winding mechanism therewith which will now be described.

*Seal wire winding, uniting and severing mechanism*

The sleeve 122 is provided for winding or affixing a strand of wire or suitable material 165 about the skirts of bottle closures. The strand of wire is directed upon the skirts by being passed through a guiding nozzle or member 163 which is carried by the lower portion 123 of sleeve 122. The discharge end of the nozzle is located sufficiently away from the axis of the plunger stem 121 as to enable the nozzle, in being revolved around the bottle and closure, to suitably apply the wire or strand 165 to the skirt thereof. The wire winding mechanism includes a reel 167 which is journalled for rotation upon an upright bracket 169 secured to the upper end of spindle or sleeve 122 by means such as clamp screw 171, whereby the bracket and spindle rotate as a unit when actuated through gear 160. The reel 167 is adapted to accommodate or support a spool 168 which carries supply of wire or strand material 165. The wire 165 is threaded from the spool 168 over a wire guiding pin 173 carried by the bracket 169, thence through the upright guiding tube 174 which is fixed in a vertical bore in the wall of sleeve 122. The wire guiding pin 173 is so shaped as to permit the wire to leave the supply spool without undue friction between the convolutions of the wire supply thus avoiding crowding of the wire. The tube 174 is disposed parallel with the axis of rotation of said sleeve and terminates above the wire guiding nozzle 163. The wire, after issuing from the lower end of the tube 174 contacts with an idler guiding wheel 176 which is journalled upon a pin 176' carried by the sleeve 122. The wire, after passing the pulley 176, extends through a guiding bore 177 in the nozzle 163, this bore directing the wire through the nozzle outlet opening 178. The end portion of the wire which has passed through the guiding nozzle is clamped between the members 180 and 181, shown in detail in Figure XVI, and which constitute a temporary anchorage for the wire in order that the same may be held at one end, during the rotation of the nozzle about the bottle and closure in sealing position effect a winding of wire therearound. The wire remains clamped while the nozzle turns substantially one and one-half times about the bottle. The clamping or retaining of the wire effected by the coaction of members 180 and 181 is accomplished at the initiation of a cycle of operations and during the time that the bottle is being moved to sealing position. The clamping member 181 is relatively stationary, being desirably part of the tapering guide 92, and the wire engaging surface thereof is preferably roughened or corrugated to prevent slipping of the wire from the clamping mechanism. The movable clamping member 180 is pivoted at 183 upon a portion of guide 92 that is carried by the upper housing, the clamping member 180 being formed with an arm which pivotally receives the end of an actuating rod 187 which extends upwardly and is connected by means of a "lost motion" connection to the lever 129. This connection includes a rod 186 slidably supported in a member 185, the rod threadedly engaging a socket housing 189, which embraces a ball 191 forming a part of pin 192 in turn carried by yoke lever 129. A spring 194 surrounds the rod 186 and is interposed between collar 196 and the upper end of member 185, and tends to resist relative movement between rod 186 and rod 187, yet providing for lost motion therebetween. Thus, the yoke lever 129 is periodically actuated to raise ball and socket joint, moving the rod 187 to effect the clamping action. The spring 194 being compressed during the clamping action on the end of the sealing wire when the clamping members are released, the spring 194 serves to resiliently return the clamping elements to normal or wire releasing position. These elements are so arranged that the clamping member 180 will be actuated to clamping position just prior to the initiating of the cycle of wire winding operations, and will remain in wire clamping position until after the overlapping wire portions are cemented or bonded together and the cement or bond is congealed. The wire is severed adjacent to but after the passage of the wire carrying nozzle, just before the wire clamping member 180 is released, which release occurs upon the arrival of the cam roller 142 at a suitably shaped raised portion of the cam 152. When the wire nozzle has been rotated one and a half times about the bottle neck to completely encircle the closure with wire and effect a predetermined overlap thereof, the fluxing, bonding, cementing or sealing means is brought into operation, as will later appear.

By means of mechanism which will be presently described, the lapping or crossing portions of the sealing wire that has been passed about a bottle and closure are bonded together, this bonding operation occurring during a fraction of the period of the engagement of the timing pins 197 and 198 with the cam 157, the cooling or congealing of the bond or seal occurring during an ensuing period of this engagement and the severing of the wire occurring during the remaining period of such engagement as will hereinafter appear.

The bond or seal means employed is desirably one which will fuse under heat and is desirably in the nature of a covering or coating on the wire or strand material. The wire preferably has a metallic core of iron, steel or fibrous material upon which is applied a coating such as tin, and a second coating of lead or solder. The solder is desirably present upon and about the wire before the wire is employed in the machine, i. e., the wire is pre-coated or covered and is supplied as such from the spool 168. The invention is not to be thus limited, however, nor is it to be limited to the soldering or cementing of lapping or crossing portions. By the winding or wire applying mechanism which has been described, the wire is closely wrapped about the closure skirt about one and one-fifth times the circumference of the closure skirt so that there is provided a closure contracting ring or annulus of the wire having mutually lapping or adjacent portions that are adapted to be joined together by fluxing the solder that is on the wire and allowing the solder to cool to retain said lapping or adjacent portions in closure contracting relation. The winding of the wire of the sealing arrangement is continued beyond the soldered or bonded lapping or adjacent portions thereof so that the mutually lapping portions form a readily destructible joint when access is to be had to the bottle contents.

Where the coating of the lapped or adjacent portions of the wire is fluxed by heat and the heat is furnished by an electric current, I employ two fingers or contacts 200, 201, which project from insulating bushings 203 supported on rods 205, these contacts being urged toward fusing or bonding position in contact with wire by means of springs 206 surrounding the rods 205. The rods are carried by a block 208, which is fixed to a toothed member or rack 210. The rack 210 is desirably so positioned that the contacts 200 and 201 engage adjacent the extremities of the lapping portions of the wire that are to be soldered or bonded together. Current is passed through the circuit that includes the fingers 200 and 201 from the source of electrical energy, electrically and mechanically operated mechanism being provided for establishing the circuit and breaking the same when the current has endured sufficiently long to melt or fuze the solder to form the bond. A mouthpiece or contact carrying element 212, preferably of insulating material, is provided which supports spring contact fingers 214 against which contacts 200 and 201 are adapted to slidably engage, the spring fingers being suitably connected to a source of electrical energy through the medium of terminals or binding posts 215. Block 208 is slidably actuated through the medium of rack 210 by means of gear sector 218 carried by bell crank 219 having an operative connection with cam 220 through the medium of a cam roller 221 carried by the bellcrank. Cam 220 is mounted on and rotates with shaft 29 and is provided with dwell portions 222, which when in contact with rollers 221 is effective to move the contact tips 200 and 201 into engagement with the wire or strand of material around the bottle closure.

The electrical energy applied to the sealing wire through the resistance at the overlapped wire portions causes sufficient heat to melt the solder which fluxes the coating at this point. The duration of the circuit and current flow are timed and controlled by mechanism to be described hereinafter, and the current flow is disconnected prior to the time when the contact fingers 214 leave the contacts 200 and 201. The contacts are then retracted from engagement with the wire which is accomplished by means of the retraction rods 205 carried by the block 208 through movement of sector 218.

After the retraction of the contacts 200 and 201 from bond forming position, the positions of the formed wire seal, closure and bottle prior to the severing of the wire from the supply are changed. Provision has been made for slightly rotating the spindle or sleeve 122 in a direction opposite to that of the wire winding or seal forming operation. This is accomplished by the use of a timing pin 193 having an enlarged head 199 engageable with the surface of a wire slackening cam 156. Engagement of the head 199 with cam 156 turns winding spindle 122 in the reverse direction enough to slacken the wire adjacent the wire guiding nozzle 163. After the wire is slackened, the bottle raising cam 52 is rotated by shaft 29 to the point at which additional upward movement is imparted to the pedestal 70, during which time the bottle and closure with the seal affixed thereon is raised slightly, causing both the end held by the clamping members 180 and 181 as well as the slackened portion of the wire to be bent slightly downwardly, thus changing the positions of these portions of the wire with respect to the wire in preparation for the cutting operation now to be described.

In order that the wire leaving the wire supply is under satisfactory tension, means have been provided to exert a frictional stress opposing rotation of the wire supply reel and spool. To this end, the reel is formed with a cylindrical drum-like portion 330 which is surrounded by two semi-circular brackets 332 carrying brake shoes 333 engageable with the periphery of the drum 330 and setting up friction opposing rotation of the drum. The semi-circular brackets 332 have one end of each pivoted upon a common pivotal point or screw 335 carried in bracket 169, as particularly illustrated in Figure XXX. The upper extremity of one of the brackets 332 terminates in an embossed portion 336 fixedly carrying a threaded rod 337 which extends loosely through a bore in the enlarged end 338 of the other bracket 332. Threaded upon the extremity of rod 337 is a knurled thumb nut 339 and interposed between the enlarged portion 338 and thumb nut 339 is a coiled spring 340 which urges the brackets 332 and brake shoes 333 into frictional engagement with the drum 330, the amount of friction tending to retard rotation of the drum and wire holding reel being dependent upon the amount of tension placed upon spring 340 by means of thumb nut 339 which may be adjusted to any suitable position to obtain a desired tension on the wire.

Another feature resides in the simple yet effective means of holding the spool 168 carrying the wire supply upon the reel 167. This means comprises a tension plate 215 secured to the reel by means of screws 216 and carrying at its free end a lug or projection 217 which engages the exterior end wall of the wire supply spool, as particularly shown in Figure V, the tension in plate 215 urging the block or spool locking member into locking position as illustrated. In order to remove the spool 168 to provide for a new wire supply spool, it is only necessary to elevate the lug 217 to bring it out of the path of the end wall of the spool 168.

The mechanism for severing the wire is inclusive of a movable knife 230, carried by hollow block 232 which is provided upon the end of a lever 233, the latter being pivoted upon the bracket 92 as at 234. Pivotally connected to lever 233 between the block 232 and pivot 234, is an actuating rod 235, which carries a swivel collar 236 pivotally connected to bell crank 238. The bell crank carries a cam roller 240 adapted to engage a knife actuating cam 242 carried by and rotatable with shaft 29. Rod 235 is provided with adjustable nuts 245, between which and collar 236 is interposed spring 243. As the knife 230 approaches the bottle closure seal to sever the portion of wire which has been slackened from the supply and bent slightly downwardly below the bond portions, spring 243 forms a resilient means to absorb the shock of engagement. When the wire has been severed through impact of the knife edge with the wire, the bell crank 238 moves the lever 233 which carries the knife and is controlled by the cam 242. The form of knife 230 shown in Figure XXI is preferably provided with a plurality of cutting edges and the blade is thus reversible end for end, the edges also being of suitable width so that only a portion thereof engages the wire to be severed. Such an arrangement provides four cutting edges by changing the relative position of the knife as many times. The knife 230 is secured in position in block 232 by means of a removable pin 231 which is provided with a groove or slot 237 adapted to engage the knife adjacent one cutting edge thereof.

After the knife has been withdrawn following the severing operation, gear 160 leaves segmental gear 154 and pins 178 and 179 engage cam 155, causing the wire nozzle to be turned slightly to return the same to its starting position. During this time, the severed end of the wire from the supply is positioned to be moved into the clamping members, because of the slackening operation previously described and backlash of the wire. The backlash or retraction is provided by means of a lever 248 carrying wire guide 173 which is actuated by cam member 250. A cup-shaped member 251 is provided on an extremity of lever 248 which rides upward and over surface 252 of cam 250, causing pin or guide 173 to contact wire 165 retracting the wire slightly back through nozzle 163 to direct the recently severed end of wire downwardly so as to cause the same to lie in a groove or slot 223 provided in the mouthpiece ring 95. Thus, as the wire guiding nozzle travels around the bottle receiving mouthpiece to its initial starting position, the end of the wire will travel through a guide slot 223 in ring portion 95 of guide 92, which causes the wire to follow the outside of the mouthpiece ring and into position to be clamped by members 180 and 181. Upon being clamped the wire is guided by a groove or depression 126 in the ring 95 adjacent the clamping members 180 and 181 as the nozzle starts its travel around the ring 95. After the wire severing operation and before the clamping of the wire is effected, the pedestal pad carrying the sealed bottle is lowered and is discharged from the machine, this discharge of the bottle being the conclusion of the cycle of operations described. This bottle is replaced upon the conveyor by the same tooth of the star wheel that carries the bottle to sealing position.

As illustrated in Figures III and XII, means have been provided adjacent the table 11 serving as a receiving station for accommodating the sealed bottles as they are carried by the conveyor 18 after the sealing operations have been completed. The means shown are inclusive of a rotatable table 96 supported upon shaft 97 which is in turn carried by legs 98. A gear supporting bracket 99 is carried by shaft 97, a portion of the bracket journally supporting a shaft upon which is mounted a sprocket wheel 101 and bevel pinion 102. The pinion 102 is in engagement with gear 103 mounted on table bracket 106 so as to rotate the latter and table 96, when the pinion is turned by its connection to sprocket 101. A chain 105 connects sprocket 101 to a second sprocket 104 carried on shaft 34, which shaft is also provided with a sprocket 47 actuated by chain 49 and receives its motion from sprocket 67 mounted on shaft 45. The table 96 is provided with a guard 96' positioned adjacent its periphery to hold the sealed bottles upon the table, the guard being provided with an inwardly extending portion which directs the bottles toward the center of table 96, thus providing for the accumulation of a plurality of bottles in circular formation.

*Electrical circuit controlling mechanisms*

The electrical mechanisms which have been illustrated are inclusive of a suitable starting switch contained in casing 260 forming the master control, the switch being electrically connected to a junction block 262, such connections being preferably carried interiorly of a conduit 264. Motor 22 for driving the machine is suitably connected to receive energy from the junction block 262, the wiring being enclosed in flexible cable 265. A transformer 267 may also be connected in the circuit and also receives its energy from the junction block 262, the transformer in turn supplying suitable transformed current through a switch mechanism 269 to the soldering fingers 200 and 201, the functions and operation of which have been previously described.

Switch mechanism 269 is preferably inclusive of a base plate or element 270 capable of being mounted upon the machine, having a cover 271 removably secured to the base by means of thumb screw 273 having threaded engagement with a boss 274 integral with the base member 270. The base is also provided with a bearing boss 276 upon which is journalled a shaft 278. The plate 270 is formed with a bearing bracket 284 which supports an outer end of shaft 278. Fixedly secured to shaft 278 between the bearing portions 276 and 284 is a depending arm 281. Positioned exteriorly of bearing portion 276 in the plate 270 and fixedly secured to shaft 278 is a collar 285 having a projection 286 preferably integral therewith. Freely mounted upon the shaft 278 and adjacent collar 285 is a trip arm 283 having an extension 287 provided with a cut-away portion 289 which accommodates the projection 286 on the collar, permitting slight lost motion between the parts. Thus, lever 283 is slightly rotatable on shaft 278 between the limits of the walls of portion 289 and relative to collar projection 286 without being effective to turn or rotate the shaft 278. To prevent longitudinal movement of trip arm or shaft 278, a collar 282 is preferably fixedly secured to the extremity of the shaft. The trip arm 283 is provided with a floating end portion 287 pivoted thereto as at 294. A spring 312 carrying a pin 313 is interposed between the end of arm 283 and pivoted portion 287 tending to resiliently urge the latter downwardly to be engaged by the cam 326. Thus, should the mechanism operate abnormally or the actuating mechanism be incorrectly adjusted, the spring 312 will permit relative movement of block 281 and prevent damage to the mechanism. A contact actuating pawl or member 280 is also carried on shaft 278, the pawl being loosely mounted for independent rotation adjacent the arm 281. Pivotally connected to an extremity of arm 281 is a link or rod 288, which link or rod extends through an opening in an enlarged portion 290 of pawl 280. A coil spring 291 surrounds the rod 288, being positioned between the enlarged portion 290 and a washer 292 carried adjacent the extremity of rod 288. Pawl 280 is provided with a stud 293 carried adjacent its lower extremity, the end of stud being preferably rounded.

Also mounted upon the plate 270 is a block or member 295 preferably of insulating material such as bakelite, fibre or the like. Pivotally mounted upon block 295 is a contact lever 296 pivoted as at 297 intermediate its ends. End 298 of the lever 296 engages the rounded portion of stud 292, being normally held in engagement therewith by means of spring 300 anchored at one end to block 295 and attached at its other end to a pin or finger 301 carried by lever 296. The other end 299 of lever 296 is provided with a plurality of removable contact points 303 and 304 of a suitable material as, for example, tungsten. Block 295 supports a contact carrying bracket 305 upon which are positioned springs or tension plates 306 and 307 which in turn carry respectively contact points 308 and 309 complementally disposed to cooperate with the contacts 303 and 304. Tension plates 306 and 307 are preferably individually mounted upon bracket 305 and normally engage a stop 310, the contact points 308 and 309 being adjusted whereby the faces of the contact points are normally arranged in different planes. By such arrangement, the contact 308 engages its complemental contact 303 before the contact 304 is engaged by contact 309 while the contact 309 is disengaged from its complemental contact 304 before the contact 308 is disengaged from contact 303 when arm 296 is actuated by the pawl 280. By this means arcing at the contacts is alleviated to a great extent.

In order to close or complete the circuit intermittently as each bottle and closure are brought into sealing position, means are provided to actuate the trip arm 283 forming a part of switch structure 269. Such means as illustrated are inclusive of the operating mechanism illustrated in Figures XXXVIII and XXXIX including a bracket 315 having portions 317 between which is rotatably mounted a worm gear 318 on a shaft 320. Arranged substantially at right angles to shaft 320 is a second shaft 322 carrying a worm 323 in engagement with worm gear 318, one end of shaft 322 carrying knurled knob or adjusting member 325. The manipulation of member 325 causes rotation of worm 323 and worm gear 318 to articulate a cam member 326 mounted upon an extremity of shaft 320, to vary the relative position of a cam surface 327 on cam 326 with respect to the trip arm 283. The cam control and switch actuating means as above described is carried by the gear segment mounting 148 and is rotatable therewith, this means passing adjacent the switch 269 once during each revolution of the gear segment. In this manner, the switch is actuated to supply the necessary current to the soldering fingers in accurately timed relation, as hereinbefore explained.

Operation

A complete cycle of sealing operations occurs with each revolution of the shafts 28 and 29 rotated by means of motor 22 through the gearing in the housing 14 and is initiated with the deposit of a bottle 10 on the conveyor 18. The bottle is moved by the conveyor into contact with bottle separating wheel 19 which at the proper time delivers the bottle to the star wheel 20 which in turn carries the same to sealing position on the pedestal 70. Pedestal 70 is subsequently elevated by means of the cam 74 so that the bottle mouth engages sealing head, the star wheel 20 remaining stationary during application of the seal to the bottle closure. As the bottle is elevated, plunger 120 and associated mechanism is raised therewith, at which time cam 151 actuates lever 129 to raise collar 132 to elevate chuck 90, plunger 120 and actuating the sealing wire clamping means 180 to clamp the wire which is threaded from spool 168 through the bore 174 in the winding spindle over pulley 176 and through the winding or guiding nozzle 163. After the wire is clamped, the winding spindle 122 is rotated by means of gear 160 in mesh with gear segment 153 carried by the wheel 148. This engagement of gear 160 with segment 153 rotates the spindle approximately one and one-half times, causing the strand of wire to encircle the bottle and closure, and provide overlapping portions of wire which are fused or bonded by an electric current, as contacts 200 and 201 are moved into engagement with the lapped portion of the wire and the electric current is applied thereto by means of the actuation of switch mechanism 296, by means of cam 326 supported on the wheel 148. After the bonding or uniting of the lapped portions of the wire takes place, the cam 74 acts to further slightly elevate the bottle carrying pedestal causing the ends of the wire adjacent the seal to be bent slightly downwardly in order that the knife 230 actuated by cam 242 may sever the wire about the bottle closure from the supply without disturbing the seal or bond. After the wire has been severed, the pedestal is lowered by continued movement of cam 74 and the winding spindle rotated to starting position. After the pedestal pad 71 reaches the level of table 11, the star wheel 20 is again actuated to remove the sealed bottle from the pedestal, replacing it upon the conveyor 18, and moving a bottle and unsealed closure to sealing position. Conveyor 18 carries the sealed bottle to the rotary table 96 which serves as a receiving station for the sealed bottles and from which these bottles are subsequently removed.

It is apparent that, within the scope of the invention modifications and different arrangements may be made other than is herein disclosed, and the present disclosure is illustrative merely, the invention comprehending all variations thereof.

What I claim is:—

1. In a device of the character disclosed, in combination, means for supplying a container and closure to position to be sealed; a sealing mechanism; means for causing successive relative movements between said container supplying means and said sealing mechanism; adjustable means for positioning containers in sealing position; means to apply a tension member about said closure and container; means to form said tension member into a destructible seal; and means to remove said sealed container from sealing position.

2. In a device of the character disclosed, in combination, a conveyor; means to intermittently time the feeding of containers on said conveyor means to position a container having a closure thereon adjacent a sealing mechanism; means to apply a destructible sealing element on said closure; means for positively extruding said sealed container from said sealing mechanism; and means to discharge a sealed container from said sealing position.

3. In a sealing mechanism for containers, the combination of a container conveyor; means to continuously operate said conveyor; an intermittently operable container separating means adjacent said conveyor; a rotatable container positioner; means to actuate said container positioner to feed containers to a sealing position; means for elevating a container in sealing position; means to apply a destructible seal to said container; means to positively release said container from said sealing means; said container positioner removing the sealed container from sealing position.

4. In combination, sealing means for containers; means to supply containers to said sealing means, including a continuously operated conveyor; means adjacent to said conveyor for intermittently timing said containers; and means for moving containers from said conveyor to said sealing means and returning said sealed containers from said sealing means.

5. In combination, sealing means for containers; means to supply containers to said sealing means, including a continuously operated conveyor and a container separating wheel; means adjacent to said conveyor for intermittently moving containers from said conveyor to said sealing means and returning said sealed containers to said conveyor; said conveyor moving said sealed containers to another position.

6. In combination, sealing means for containers; means to supply containers to said sealing means including a continuously operated conveyor and a container timing wheel, said conveyor having means associated therewith whereby containers are moved to and from said sealing means, said containers being subsequently carried by said conveyor to another position relative to said sealing means.

7. In combination with means to apply a destructible seal to a container having a closure thereon; of means to supply containers to said seal applying means including an endless conveyor; intermittently movable container separating means associated with said conveyor, rotatable means adjacent said conveyor to periodically carry containers from said conveyor to said seal applying means; adjustable means cooperating with said rotatable means for selectively positioning the containers in seal applying position; said rotatable means returning the sealed containers to said conveyor.

8. In a sealing mechanism for containers, the combination of a container conveyor; means to continuously operate said conveyor; an intermittently operated container separating member positioned adjacent said conveyor; a container positioning wheel; means to periodically rotate said wheel; said container separating member being rendered effective upon actuation of said wheel to feed containers selectively to a sealing mechanism; said mechanism including a container elevating means, means to apply a seal to said container from a supply of sealing material; cam actuated means to positively release the sealed container from said sealing mechanism; said container positioning wheel acting to return said sealed containers to the conveyor.

9. In a sealing mechanism, the combination of a conveyor; an intermittently rotatable container separator positioned adjacent said conveyor; a container positioning wheel; said container separator being rendered effective upon actuation of said container positioning wheel to move containers to said sealing mechanism; said mechanism including a cam actuated container elevating means, means to apply a strand to said container from a supply of strand material, electrical means for bonding the strand to form a seal; means to sever said strand; cam actuated means to release said container from said sealing mechanism; said container positioning wheel returning said sealed containers to said conveyor.

10. In a container seal applying mechanism, in combination; a rotatable shaft; said shaft having means for removably and selectively supporting container positioning wheels formed to accommodate containers of various sizes, said container positioning wheel adapted to be periodically actuated to move containers to seal applying position; a container stop means cooperating with said container positioning wheel to selectively locate the containers in seal applying position; means for adjusting said container stop means to accommodate containers of various sizes; and means for selectively applying seals to containers brought into contact with the container stop means.

11. In a container seal applying mechanism; a combination with an endless container conveyor; a rotatable shaft positioned adjacent said conveyor, said shaft having means for removably and selectively supporting container positioning wheels to accommodate containers of various sizes, said container positioning wheels adapted to be periodically actuated to move containers from said conveyor to seal applying position; an adjustable container stop means cooperating with the rotatable container positioning wheel to successively position the containers in seal applying position; means for adjusting said container stop means to accommodate containers of various sizes; means for successively applying seals to containers brought into contact with the container stop means, said container positioning wheel serving to return sealed containers to the conveyor.

12. In combination with an electrical controlling mechanism, for container sealing machines, a circuit controlling device having a cam actuated member periodically engageable with a cam timing element, said device including a support; a plurality of relatively stationary independently mounted contacts carried by said support; a movable member carrying a plurality of contacts cooperating with said relatively stationary contacts; means associated with said member for actuating said movable contacts to make and break an electrical circuit; and resilient means interposed between said cam actuated member and said movable contact carrying member.

13. In combination with a current controlling mechanism for container sealing machines, a circuit controlling device having an operating member engageable with an adjustable actuating cam; said device including a housing; a plurality of relatively stationary resiliently supported contacts mounted in said housing; an arm carrying a plurality of movable contacts cooperating with said relatively stationary contacts; means associated with said operating member for actuating said movable contacts; said relatively stationary contacts having their contacting faces in different planes to provide successive engagement and disengagement with said movable contacts.

14. In a machine for applying destructible seals to containers, the combination of a conveyor and a container guide, said container guide being adjustable to accommodate various sized containers; means to periodically and successively move containers from said conveyor to seal applying position; means operable to resiliently elevate said containers in seal applying position; means to positively lower said containers; and a container accumulating table rotatable adjacent one end of said conveyor to accommodate a plurality of sealed containers.

15. In a machine for applying destructible seals to containers the combination of means to successively supply containers to sealing position; means to apply a seal from a substantially continuous strand to said container; said seal including a metallic core having a covering thereon of fluxible material which unites to form a bond upon application of heat thereto; means to move said container to sever said seal from said supply means to positively release a sealed container from said seal applying means; and means to discharge sealed containers from said machine.

16. In a machine for applying destructible seals to containers, the combination of a conveyor, said conveyor having means adjustable with respect thereto to accommodate various sized containers; rotatable means to remove a container from said conveyor; means operable to elevate said container into a seal applying means; means to apply a seal from a substantially continuous strand of material having a fluxible covering thereon; means to flux said covering to form a destructible seal; means to further elevate said container said rotatable means serving to return the sealed containers to said conveyor at the completion of the sealing operations.

17. In a machine for applying destructible seals to containers having skirted closures thereon, the combination of means to supply containers to sealing position; means to gather the skirts of said closures about said containers; means to apply a metallic seal to said container and closures; means including a knife having reversible cutting edges for severing said metallic seal from a supply; said seal including a metallic core having a covering thereon of fluxible material; means to unite portions of the fluxible material to form a bond; means to release a sealed container from said sealing position; and means to discharge sealed containers from said machine.

18. In a device of the character described, in combination, means to position a container and closure relative to a sealing mechanism; means to cause relative movement between said container and said mechanism; means to wind a sealing element about said container and closure; means to form said element into a destructible seal; means to cause additional relative movement between said container and said sealing mechanism; means to sever said sealing element from a supply; and means to remove a sealed container from said mechanism.

19. In a device of the character described, in combination, adjustable means to position a container and closure relative to a sealing mechanism; means to cause relative movement therebetween; said adjustable means serving to audibly indicate improper adjustment of said positioning means.

20. In a sealing mechanism for milk bottles, the combination of a conveyor; means to operate said conveyor; bottle separating means adjacent said conveyor; a bottle positioner; bottle sealing means; means to actuate said bottle positioner to feed bottles adjacent said sealing means; means for elevating a bottle to sealing position; means to positively release said bottle from said sealing means; said bottle positioner returning the sealed bottle to said conveyor.

21. In a sealing mechanism for milk bottles, the combination of a conveyor; means to operate said conveyor; an intermittently operated bottle separating member cooperating with said conveyor; a bottle positioning means; means to periodically rotate said means; means to release said bottle separating member upon actuation of said positioning means to feed bottles selectively to a sealing mechanism; said mechanism including a bottle elevating means, means to apply a seal to said bottle; cam actuated means to release the sealed bottle from said sealing mechanism; said bottle positioning means returning said sealed bottles to said conveyor.

22. In a milk bottle sealing mechanism, the combination of a conveyor; an intermittently rotatable bottle separator positioned adjacent said conveyor; a bottle positioning wheel; means to release said bottle separator upon actuation of said bottle positioning wheel to move bottles to said sealing mechanism.

23. In a milk bottle sealing mechanism, the combination of a conveyor; an intermittently rotatable bottle separator positioned adjacent said conveyor; a bottle positioning wheel; means to release said bottle separator upon actuation of said bottle positioning wheel to move bottles to said sealing mechanism; cam actuated means to release said bottle from said sealing mechanism; said bottle positioning wheel returning said sealed containers to said conveyor.

24. In a bottle sealing mechanism, in combination; a rotatable shaft, a bottle positioning wheel carried by said shaft; a bottle stop means cooperating with said bottle positioning wheel to selectively locate the bottles in seal applying position; means for adjusting said bottle stop means to accommodate bottles of various sizes; and means for selectively applying seals to bottles brought into contact with the bottle stop means.

25. In a bottle seal applying mechanism, an endless conveyor; a rotatable shaft positioned adjacent said conveyor, said shaft having means for removably and selectively supporting positioning wheels to accommodate bottles of various sizes, said bottle positioning wheels adapted to be periodically actuated to move bottles from said conveyor to seal applying position and return sealed containers to said conveyor.

26. In a machine for applying destructible seals to containers having skirted closures thereon, the combination of means to supply a container to sealing position; means to apply a seal to said container and closure; means including a knife having reversible cutting edges for severing said seal from a supply; means to release a sealed container from said sealing position; and means to discharge sealed containers from said machine.

27. In a device of the character described, in combination, means to position a container and closure relative to a sealing mechanism; means to cause relative movement between said container and said mechanism; means to apply a seal to said closure; means to cause additional relative movement between said container and said sealing mechanism; and means to remove a sealed container from said mechanism.

28. In a milk bottle sealing mechanism, the combination of a conveyor; a bottle positioning wheel; an intermittently rotatable bottle separator adjacent said conveyor and cooperating with said wheel; and means to release said bottle separator upon actuation of said wheel to allow bottles to be moved to said sealing mechanism.

29. The method of sealing a bottle including the steps of moving a bottle and closure adjacent a sealing mechanism, of elevating the bottle and closure to position to be sealed, of applying sealing material from a supply, of further elevating the bottle and closure, and of severing the sealing material from the supply.

30. The method of sealing a bottle including the steps of applying a skirted cap over the mouth of a bottle, of moving the bottle and closure adjacent a sealing mechanism, of elevating the bottle and closure to position to be sealed, of applying sealing material around the closure, of joining portions of the sealing material to form a destructible joint, of further elevating the bottle and closure, of severing the sealing material, and of lowering the sealed bottle to position to be removed from the mechanism.

31. In a milk bottle sealing mechanism, the combination of a continuously operating mechanical conveyor for moving bottles to and from the sealing mechanism; a bottle positioning wheel; an intermittently rotatable bottle separator adjacent said conveyor and cooperating with said positioning wheel; means to release said bottle separator upon actuation of said positioning wheel to allow bottles to be moved to said sealing mechanism; and means whereby bottles are delivered from said positioning wheel after being sealed to said movable conveyor.

CHRISTIAN H. BRINTON.